(12) United States Patent
Maeda et al.

(10) Patent No.: US 8,018,672 B2
(45) Date of Patent: Sep. 13, 2011

(54) MAGNETIC RECORDING DEVICE AND MAGNETIC RECORDING METHOD THEREOF

(75) Inventors: Hideaki Maeda, Kanagawa (JP);
Hiroyasu Tanabe, Kanagawa (JP);
Masafumi Mochizuki, Kanagawa (JP);
Hideki Zaitsu, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 14 days.

(21) Appl. No.: 12/622,064

(22) Filed: Nov. 19, 2009

(65) Prior Publication Data
US 2010/0128382 A1    May 27, 2010

(30) Foreign Application Priority Data
Nov. 21, 2008   (JP) .................................. 2008-298846

(51) Int. Cl.
*G11B 5/02* (2006.01)

(52) U.S. Cl. ................ 360/59; 360/31; 360/76

(58) Field of Classification Search ........................ None
See application file for complete search history.

(56) References Cited

U.S. PATENT DOCUMENTS

| | | | |
|---|---|---|---|
| 6,493,164 B1 * | 12/2002 | Kikitsu et al. | 360/59 |
| 7,027,248 B2 * | 4/2006 | Hamaguchi et al. | 360/59 |
| 7,864,475 B2 * | 1/2011 | Nakamura | 360/59 |

FOREIGN PATENT DOCUMENTS
JP       2007/012226       1/2007

* cited by examiner

*Primary Examiner* — Jason Olson
(74) *Attorney, Agent, or Firm* — Zilka-Kotab, PC

(57) ABSTRACT

A magnetic recording device according to one embodiment includes a magnetic recording medium having a magnetic recording layer; a recording element positioned on a head slider; an assistance element for supplying assistance energy to an area on the recording layer to which a recording magnetic field generated by the recording element is applied, the assistance element being positioned on the head slider; and a controller for controlling a size of an assistance area from the assistance element in accordance with a position of the head slider in a radial direction of the magnetic recording medium. Additional systems and methods are also presented.

14 Claims, 23 Drawing Sheets

MAGNETIC RECORDING DEVICE AND MAGNETIC RECORDING METHOD THEREOF

RELATED APPLICATIONS

The present application claims priority to a Japanese Patent Application filed Nov. 21, 2008, under Appl. No. 2008-298846, which is incorporated herein by reference.

FIELD OF THE INVENTION

The present invention relates to a magnetic disk drive and a magnetic recording method thereof, and specifically, the present invention relates to controlling a magnetic disk drive with an assisted magnetic recording scheme that reduces coercivity in a magnetic recording layer by applying energy to a magnetic recording medium while recording magnetic information.

BACKGROUND OF THE INVENTION

A magnetic disk drive, such as a hard disk drive (HDD) comprises a magnetic recording medium, a spindle motor for spinning the magnetic recording medium, a head slider with a recording and reproducing element mounted thereon, a suspension for supporting the head slider, and a voice coil motor (VCM) to drive the suspension supporting the head slider such that the head slider is positioned where desired data is recorded.

The HDD, when recording and reproducing information, rotates the suspension with the VCM so that the recording and reproducing element (head element portion) flies above a desired track of the many tracks formed on the magnetic recording medium. The HDD locates the current position by retrieving a position signal called a servo signal arranged on the tracks and moves the recording and reproducing element to the desired track. In a recording operation, the HDD refers to a position signal retrieved by the reproducing element to move the recording element to the recording position. Similarly, in a reproducing operation, the HDD refers to the position signal retrieved by the reproducing element to move the reproducing element to the reproduction position.

Tracks are formed circumferentially, and as described above, the recording and reproducing element on a head slider moves by the VCM's rotational movement around the axis of the suspension. Accordingly, the angle between the recording element, the reproducing element, and the track vary with the radial position on the magnetic recording medium. The directional difference between the longitudinal direction of the head slider and the tangential direction (circumferential direction) of the track at the position of the recording element or the reproducing element is called a skew angle. The skew angle varies depending on the radial position of the magnetic recording medium.

As more and more requests for the digitalization of information and miniaturization of stored data have been made in recent years, higher recording density of magnetic recording medium is desired to accommodate these requests, particularly in HDDs. To attain such a high recording density, a recording area per bit should be reduced. However, this reduction causes the boundaries of recorded information (a recording bit) to not agree with the boundaries of magnetic particles. At the boundaries of recording bits, magnetic transition points are unstable, causing increases in noise. To suppress such noise, the diameters of magnetic particles may be reduced.

On the other hand, decreases in the particle diameter reduces magnetic energy of the magnetic particle and if the magnetic energy becomes lower than the thermal energy, evanescence of magnetic information, referred to as thermal fluctuation, occurs. To cope with the thermal fluctuations, the recording layer of a magnetic recording medium may be made of a magnetic particle material having a greater magnetic anisotropy constant. As a result, the coercivity increases together with the anisotropy, so the recording magnetic field has to be strengthened. To produce a stronger recording magnetic field, miniaturization of a recording element becomes difficult. Conversely, a recording magnetic field generated by a tiny recording element cannot exceed the coercivity of the magnetic recording medium, and information cannot be recorded.

To overcome the above-described problem, assisted magnetic recording schemes utilizing energy by heat or electromagnetic waves have been proposed. Among such schemes, heat-assisted magnetic recording (HAMR) is described with reference to FIG. 10. FIG. 10 indicates the relationship between the temperature and the coercivity of magnetic particles. The coercivity of a magnetic recording medium utilizing the magnetic particles is Hc0 at a normal temperature Tr° C. Warming the recording layer reduces the coercivity Hc. When the recording layer is heated to the temperature Tw or higher, the recording magnetic field Hw generated by a tiny recording element exceeds the Hc of the medium to allow recording. As a heating means, use of near-field light has been suggested in recent years, in addition to laser beams.

On the other hand, during non-recording, the temperature of the magnetic recording layer falls so that the coercivity returns to Hc0 at a high level. Thus, the high coercivity may provide the tolerance to thermal fluctuations during non-recording. In this way, the basic concept of HAMR is to reduce the coercivity of the recording layer by heating the magnetic recording medium and then to perform recording at the recording magnetic field intensity that the recording element is capable of generating. Such HAMR may be divided into the following three kinds in accordance with the coercivity of the recording layer of the magnetic recording medium and the recording magnetic field intensity from the head element portion, the kind and size of the constituent to heat the medium, and the like. In the present specification, these are referred to as the magnetic field scheme, the heat spot scheme, and the hybrid scheme.

FIG. 11A schematically depicts a configuration of the magnetic field scheme. An HDD according to the magnetic field scheme comprises a tiny recording element 602 compared with a wide heat spot (heating area) 601. The heat spot 601 is a demagnetization area. Data is recorded in the area where the heat spot 601 simultaneously overlaps with the recording magnetic field. In FIG. 11A, it is assumed that the recording magnetic field is formed in the area of the recording element 602. These are the same in the other figures which will be described later.

In FIG. 11A, the heat spot diameter is sufficiently larger than the width of the recording element. Hence, in the area where the recording magnetic field Hw is attained on the magnetic recording medium (the area where the heat spot 601 overlaps the recording element 602 in the drawing), the coercivity Hc of the magnetic recording medium is weaker than the magnetic intensity in the recording magnetic field Hw. Accordingly, the recording width (track width) on the magnetic recording medium is determined depending on the width of (the trailing edge of) the recording element 602. The recorded magnetization in the adjacent areas is not demagnetized by heat, or the effect of heat is minor.

FIG. 11B schematically depicts the configuration of the heat spot scheme. An HDD according to the heat spot scheme comprises a sufficiently wide recording element 604 compared with a narrower diameter of a heat spot 603. In this configuration, the area where the recording magnetic field Hw is attained on the magnetic recording medium (the area where the heat spot 603 overlaps the recording element 604 in the figure) has a width wider than the diameter of the heat spot 603. Data is recorded in the area where the heat spot 603 simultaneously overlaps with the recording magnetic field. Hence, the recording width (track width) is determined depending on the diameter of the heat spot 603. The recorded magnetization in the adjacent areas is not demagnetized by the recording magnetic field of the recording element 604, or the effect thereof is minor.

FIG. 11C schematically depicts the configuration of the hybrid scheme. Magnetic data is recorded in the area where the heat spot overlaps with the recording magnetic field. Namely, the width (recording width) 610 of the area where data has been recorded is that of the heat spot or of the recording magnetic field, whichever is smaller. In the present configuration, the magnetization of the magnetic recording layer is demagnetized not only by the heat within the heat spot but also by the recording magnetic field. Namely, the effect to the adjacent tracks reaches the area 611 where the heat spot diameter is wider or the area 612 where the recording magnetic field width is wider. Accordingly, it is necessary to design the heat spot diameter and the recording magnetic field width such that neither protrudes to the adjacent tracks.

A conventional technique, for example a technique disclosed in Japanese Patent Office Pub. No. 2007-12226, has been known that changes the heat spot diameter to attain a narrow track width independently of the heat spot diameter and the width of the recording element.

As described above, the width recorded in the HAMR is determined by the heat spot diameter and the width of the recording magnetic field. In a magnetic disk drive, like the above-described HDD, which employs a rotary actuator for moving a head slider by rotational movement of a VCM, the positional difference in the radial direction on a magnetic recording medium appears as change in positional difference in the radial direction of the elements on the head slider with change in skew angle. In other words, as the skew varies, the positions of the recording element and the assistance element vary in the radial direction. At a radial position having a great absolute value of the skew angle, the recording width varies unintentionally and disadvantageously. Accordingly, it would be advantageous to suppress variations in recording width even if the radial positions of an assistance element and a recording element vary due to the skew angle.

SUMMARY OF THE INVENTION

In one embodiment, a magnetic recording device comprises a magnetic recording medium having a magnetic recording layer, a recording element provided on a head slider, an assistance element provided on the head slider, for supplying assistance energy to an area on the recording layer to which a recording magnetic field generated by the recording element is applied, and a controller for controlling the size of the assistance area from the assistance element in accordance with the position of the head slider in the radial direction of the magnetic recording medium. A proper recording assistance diameter is provided to accomplish a desired recording width depending on the radial position.

In some embodiments, the controller reduces the assistance area in accordance with an increase in the skew angle which is the directional difference between of the longitudinal direction of the head slider and a recording track. This reduces the effects of the magnetic recording field on the adjacent tracks. The controller also controls the assistance element, according to some approaches, so that the width of the assistance area in the disk radial direction is located within the recording magnetic field width of the recording element. This reduces the effects on the adjacent tracks, while attaining a desired track width.

In some approaches, the controller sequentially writes a plurality of consecutive recording tracks from one side in the disk radial direction to the other side so that each track overlaps a part of the adjacent recording track which has already been written. Also, the controller controls the assistance element so that the edge of one side of the assistance area is located within the recording magnetic field of the recording element in each writing of the plurality of consecutive recording tracks. This reduces the effects on the adjacent tracks, while attaining a proper track width.

The controller corrects a target position of the recording element in accordance with the difference caused by the skew angle between the center of the area to be assisted and the center of the recording magnetic field of the recording element in some approaches. This accomplishes a wider recording width. The controller may also measure the difference between the center of the recording magnetic field width of the recording element and the center of the assistance area at different radial positions, and may determine the assistance area at each radial position on the basis of the difference, in some embodiments. Thereby, more accurate control of the assistance area may be accomplished. The controller measures the difference by measuring an area demagnetized by the assistance area and a width recorded by the assistance area and the recording magnetic field at each radial position. Thereby, accurate measurement may be accomplished.

In another approach, a setting method to a magnetic recording device for recording data onto a recording layer of a magnetic recording medium by means of a recording magnetic field from a recording element and assistance energy from an assistance element is provided. This method measures the difference between the center of a recording magnetic field width of the recording element and the center of an assistance area at different radial positions of a magnetic recording medium. It determines the size of the assistance area appropriate for the radial position of the magnetic recording medium, in accordance with the measured results. It also registers data indicating the size of the assistance area appropriate for the radial position. Such a measurement allows attaining data required for control of the assistance area accurately.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

DETAILED DESCRIPTION

Figure 1A:
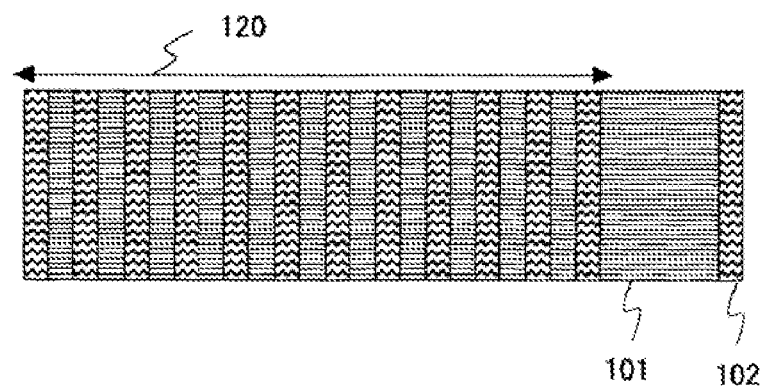
FIG. 1A is an exemplary drawing illustrating a method of measuring a heat spot diameter in the hybrid scheme, according to one embodiment.
Figure 1A:
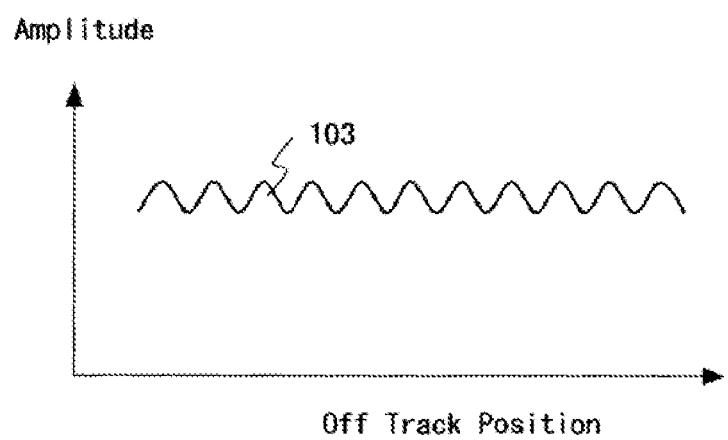

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a magnetic recording device comprise a magnetic recording medium having a magnetic recording layer; a recording element positioned on a head slider; an assistance element for supplying assistance energy to an area on the recording layer to which a recording magnetic field generated by the recording element is applied, the assistance element being positioned on the head slider; and a controller for controlling the size of an assistance area from the assistance element in accordance with the position of the head slider in a radial direction of the magnetic recording medium.

In another general embodiment, a method for recording data onto a recording layer of a magnetic recording medium comprises measuring a difference between a center of a recording magnetic field width of a magnetic recording element and a center of an assistance area of an assistance element at different radial positions of a magnetic recording medium; determining a size of the assistance area appropriate for each radial position of the magnetic recording medium in accordance with the measured difference; and registering data indicating the size of the assistance area appropriate for each radial position.

According to some approaches, a proper recording assistance diameter is provided to accomplish a desired recording width appropriate for the radial position. Hereinafter, a preferred embodiment is described. For clarity of explanation, following descriptions and accompanying drawings may contain omissions and simplifications as appropriate. Throughout the figures, like components are denoted by like reference numerals, and their repetitive description is omitted if not necessary for clarity of explanation. Hereinafter, a preferred embodiment is described in which a hard disk drive (HDD), as an example of a magnetic recording device, is used. In the present embodiment, an HDD employing the heat-assisted recording scheme is primarily described. However, embodiments may be applied to assisted magnetic recording schemes using any assistance energy, such as heat energy, electromagnetic wave energy, etc.

In an information recording and reproducing device using a conventional heat assisted recording scheme, a magnetic recording element and a heat source are displaced depending on the radial position, causing problems such as writing a signal of low quality and degradation of a signal on an adjacent track. To solve this problem, one embodiment measures the areas of a magnetic recording element and a heat source at every radial position, and if a signal on an adjacent track is degraded because of the heat source and the magnetic field, it exercises control so that a heat spot and a strong magnetic field to cause demagnetization is located within the relevant track. If a signal on the adjacent track is degraded because of the heat or the magnetic field, it exercises control so that a heat spot or a strong magnetic field to cause demagnetization is located within the relevant track.

Figure 11A:
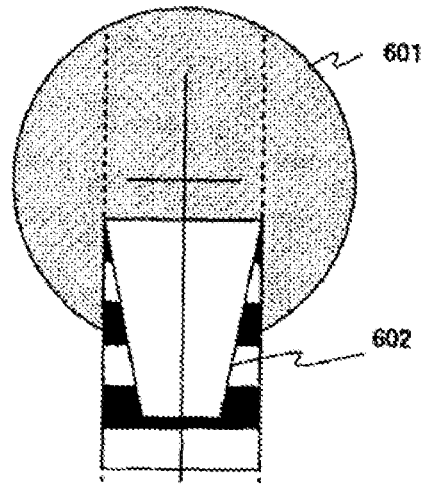
FIG. 11A is an exemplary drawing illustrating a type of scheme in the HAMR.
Figure 11B:
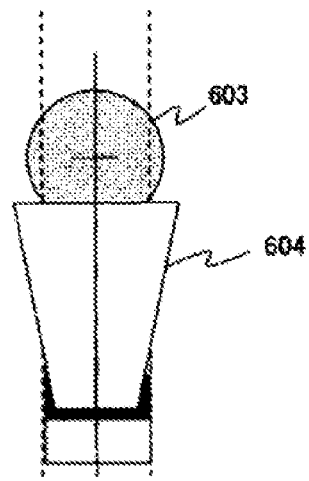
FIG. 11B is an exemplary drawing illustrating a type of scheme in the HAMR.
Figure 11C:
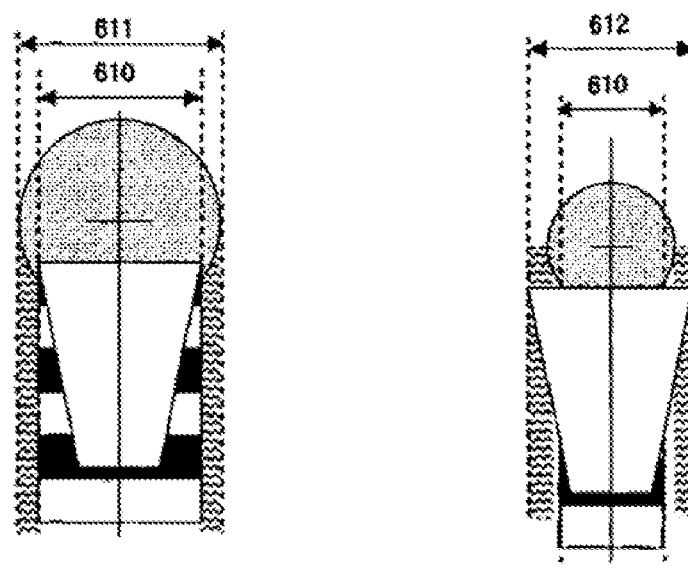
FIG. 11C are exemplary drawings illustrating a type of scheme in the HAMR.

Now referring to FIGS. 1A-1D, in an HDD according to the hybrid scheme described with reference to FIG. 11C, a method for measuring a heat spot diameter and the distance between a heat spot and a recording magnetic field is described according to one embodiment. In the hybrid scheme, if a specific track width has been set, the heat spot and the recording magnetic field may be controlled so as not to affect the adjacent tracks. On the contrary, if the recording width has been set so as to assure a certain level of signal quality, the area to be demagnetized by the heat spot and the recording magnetic field inclusively is taken into consideration in designing a track pitch.

To accomplish the above, in designing or manufacturing HDDs, measurement of a heat spot diameter and the distance between a heat spot and a recording magnetic field are characteristics used in designing the HDD. A method for measuring a heat spot diameter is now explained. The measurement, in some approaches, is performed by a test apparatus or an HDD in a test step for designing HDDs or a test step in manufacturing the HDD. The following is a measurement procedure according to one embodiment.

First, as shown in FIG. 1A, the method performs recording on a position to be measured and the nearby several tracks at a constant recording frequency. In FIG. 1A, the left-right direction is the radial direction and the top-bottom direction is the circumferential direction. On the left and right of a recording pattern 101, bands having an erasure width 102 are formed. It may preliminarily record recording patterns 101 on the magnetic recording medium with an element other than a recording element and a heat assistance element mounted on the HDD, or may write the recording patterns 101 on the recording surface with a head in the HDD.

It is sufficient that the recording frequency be high enough to obtain a strong enough read signal, for example at one tenth of the highest recording frequency (bit-by-bit inversion), the area 120 to be recorded is large enough for a design value including tolerance for the heat assistance element and the recording element. The off-track profile 103 in the preliminarily recorded area 120 exhibits periodic variations in amplitude in the radial direction (the left-right direction in the drawing).

Subsequently, as shown in FIG. 1 B, the method demagnetizes the area 120 recorded at a constant recording frequency by a heat spot 104 while activating only the heat assistance element. The demagnetized area 107 has a width of the diameter 121 of the heat spot 104. It reads the area 120 having the constant frequency including the demagnetized area 107 with a reproducing element while changing its radial position in little increments, to create an off-track profile 108.

Within the area 120 having the constant frequency, the amplitude in the demagnetized area has been degraded. Hence, the method measures the width of the area having the degraded amplitude to measure the heat spot diameter 121. Moreover, it repeats this measurement while changing the power to be applied to the heat assistance element (the output of the heat assistance element) to determine the change rate of the heat spot diameter 120 to the supply power to the heat assistance element.

Figure 1B:
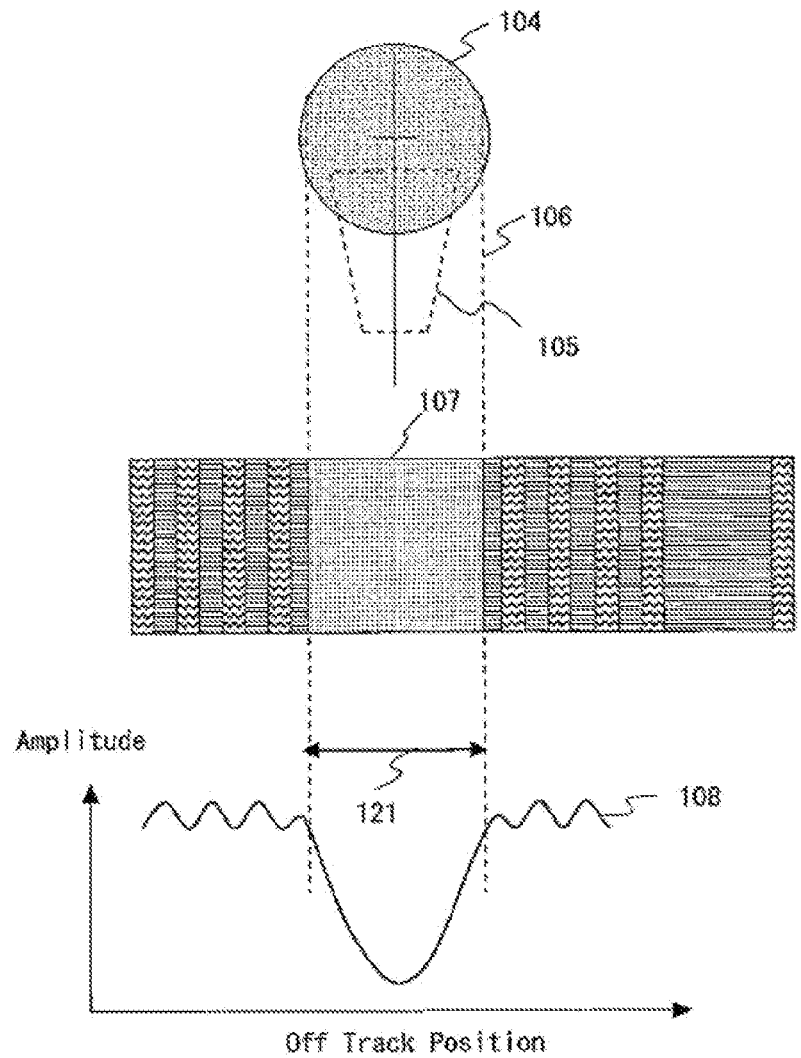
FIG. 1B is an exemplary drawing illustrating a method of measuring a heat spot diameter in the hybrid scheme, according to one embodiment.
Figure 1C:
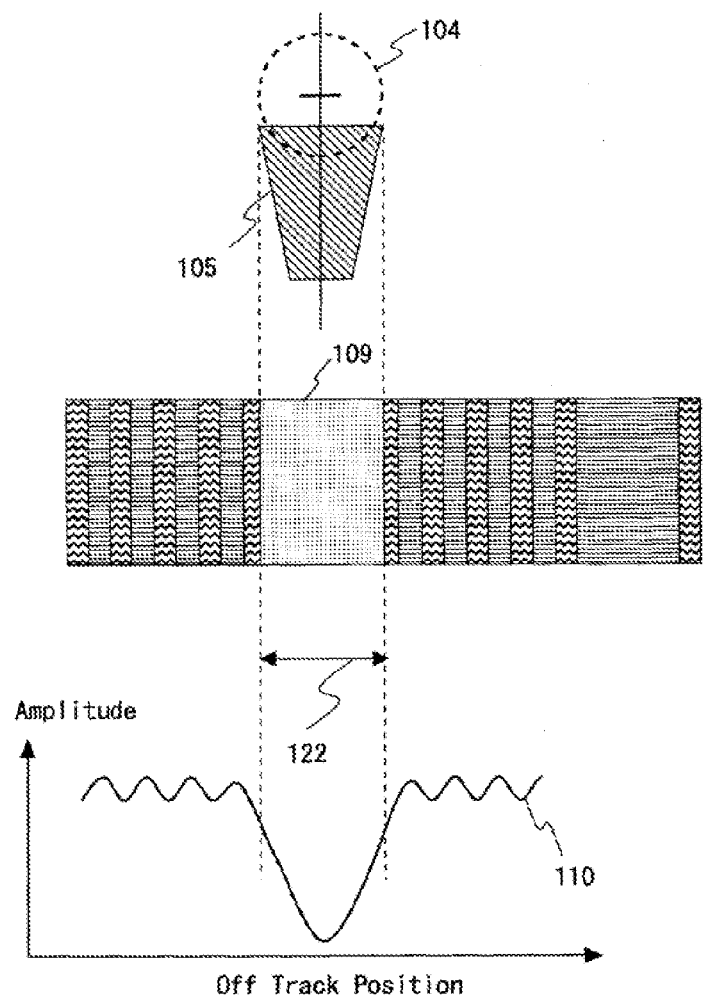
FIG. 1C is an exemplary drawing illustrating a method of measuring a heat spot diameter in the hybrid scheme, according to one embodiment.

Similarly, as shown in FIG. 1C, it demagnetize the area 120 having a constant recording frequency only by generating a recording magnetic field with the recording element 105. The demagnetized area 109 has the same width as the recording magnetic field width 122. It reads the area 120 having the constant frequency including the demagnetized area 109 with a reproducing element while changing its radial position in little increments, creating an off-track profile 110. In FIGS. 1B and 1C, the amplitude values defining the widths 121 and 122 of the demagnetized areas are shown differently, but it is merely based on the difference depending on whether recording patterns 101 or erasure widths 102 lie next to the demagnetized area.

The method measures the width of the area where the amplitude has been degraded in the area 120 having the constant frequency to measure a recording magnetic field width 122. Moreover, it repeats this measurement while changing the recording current (recording power) to be applied to the recording element 105 to determine the change ratio of the recording magnetic field width 122 to the recording current applied to the recording element 105.

Figure 1D:
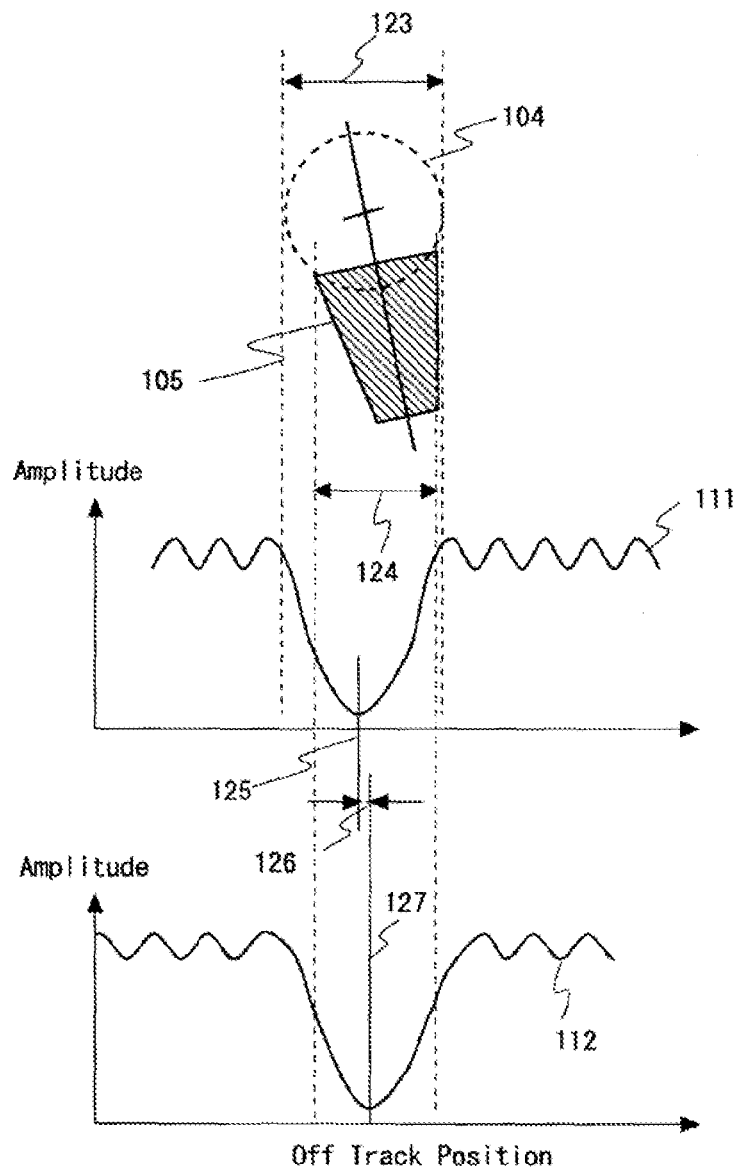
FIG. 1D is an exemplary drawing illustrating a method of measuring a heat spot diameter in the hybrid scheme, according to one embodiment.

Next, as shown in FIG. 1D, at a selected radial position, the method determines the power for the heat assistance element so that the heat assistance element will have a specific heat spot diameter 123, and creates an off-track profile 111 to show demagnetization by the heat spot 104. Further, it determines a recording current at which the heat assistance element will have a specific recording magnetic field width 124, and performs recording. It reads the recorded area with a reproducing element while changing its radial position in little increments to create an off-track profile 112 showing the demagnetization by the recording magnetic field width 124. The gap 126 between the center position 125 of the profile 111 and the center position 127 of the profile 112 indicates the positional difference amount between the heat spot 104 and the recording magnetic field at the measurement radial position. Moreover, while changing the radial position, it measures the positional difference amount between the heat spot and the recording magnetic field at a plurality of different radial positions. Thereby, at each of the different radial positions, the difference amount in the radial direction may be detected.

From the relationship between the positional difference amount of the heat spot from the recording magnetic field and the radial position, the relationship between the recording current and the recording magnetic field width, and the relationship between the power and the heat spot diameter obtained through the above-described method, the power of the heat assistance element and the recording current may be determined so as to obtain the optimum heat spot diameter 104 and recording magnetic field width 124 at each radial position, according to some approaches. The HDD records data at the determined power and recording current. In this way, in the HAMR according to the hybrid scheme, through measurement of the heat spot diameter and the positional difference amount between a heat spot diameter and a recording magnetic field, the optimum output (power) of the heat assistance element may be determined.

Next, referring to FIGS. 2A-2C, in an HDD according to the heat spot scheme described with reference to FIG. 11B, a method for measuring a heat spot diameter and the distance between a heat spot and a recording magnetic field is described according to one embodiment. In the heat spot scheme, if a specific track width has been set, the heat spot may be controlled so as to conform to the specific track width.

Figure 2A:
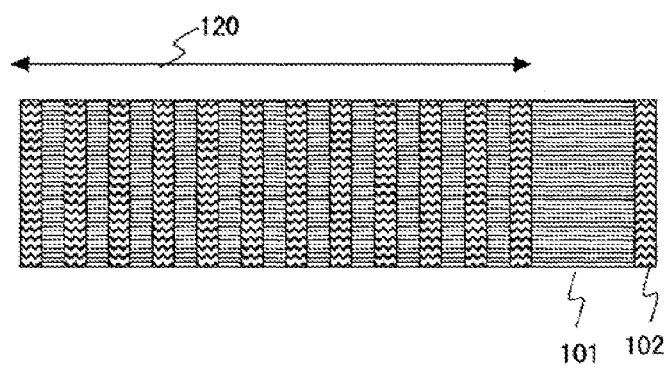
FIG. 2A is an exemplary drawing illustrating a method of measuring a heat spot diameter in the heat spot scheme, according to one embodiment.
Figure 2A:
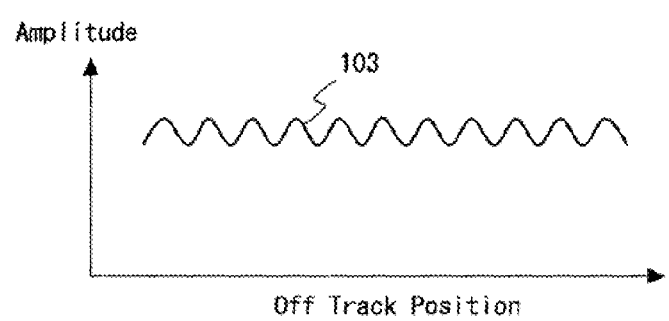

First, as shown in FIG. 2A, the method records several tracks at the measurement position and its adjacencies at a constant recording frequency. It preliminarily records recording patterns 101 on the magnetic recording medium, with an element other than a recording element and a heat assistance element mounted on the HDD. Similar to the example described with reference to FIG. 1A, it is desirable that the recording frequency be sufficiently high. To create profiles of signal recording and reproducing afterward, it is preferable that the recording frequency should not be as high as to be saturated (from one-fourth to one-sixth of the highest recording frequency). Besides, the area to be recorded or reproduced is the same as the one in the example explained with reference to FIG. 1A.

Figure 2B:
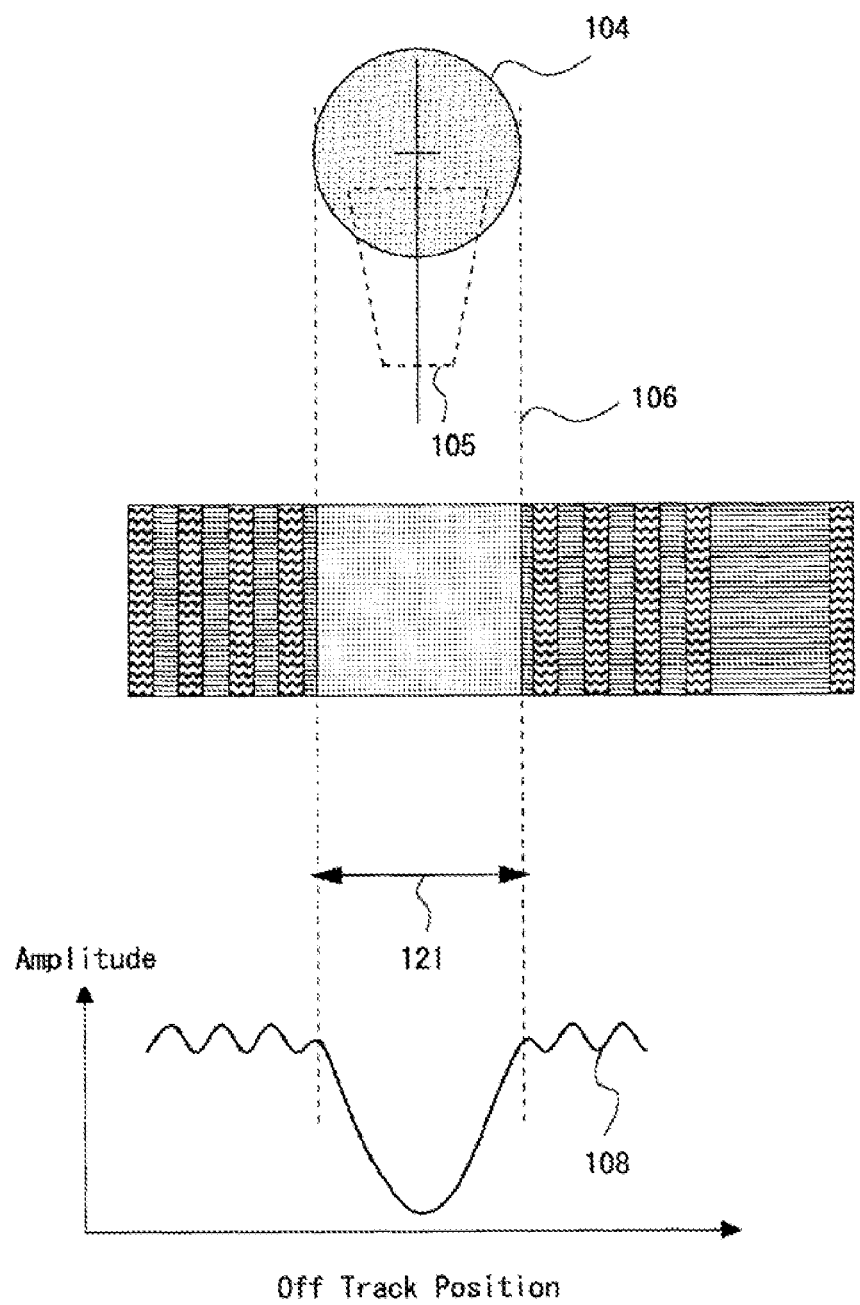
FIG. 2B is an exemplary drawing illustrating a method of measuring a heat spot diameter in the heat spot scheme, according to one embodiment.

Subsequently, as shown in FIG. 2B, in the area 120 recorded at a constant recording frequency, the method activates only a heat source (heat assistance element) and demagnetizes a part of the area 120 recorded at the constant recording frequency. Then, it reads the area 120 having the constant frequency including the demagnetized area with a reproducing element while changing its radial position in little increments, and creates an off-track profile 108. Compared with the area 120 having the constant frequency, the amplitude in the demagnetized area has degraded. It measures the width of the area where the amplitude has been changed to measure the heat spot diameter 121. Moreover, it performs the measurement while changing the output (power) of the heat assistance element to determine the change ratio of the heat spot diameter to the power of the heat assistance element.

Figure 2C:
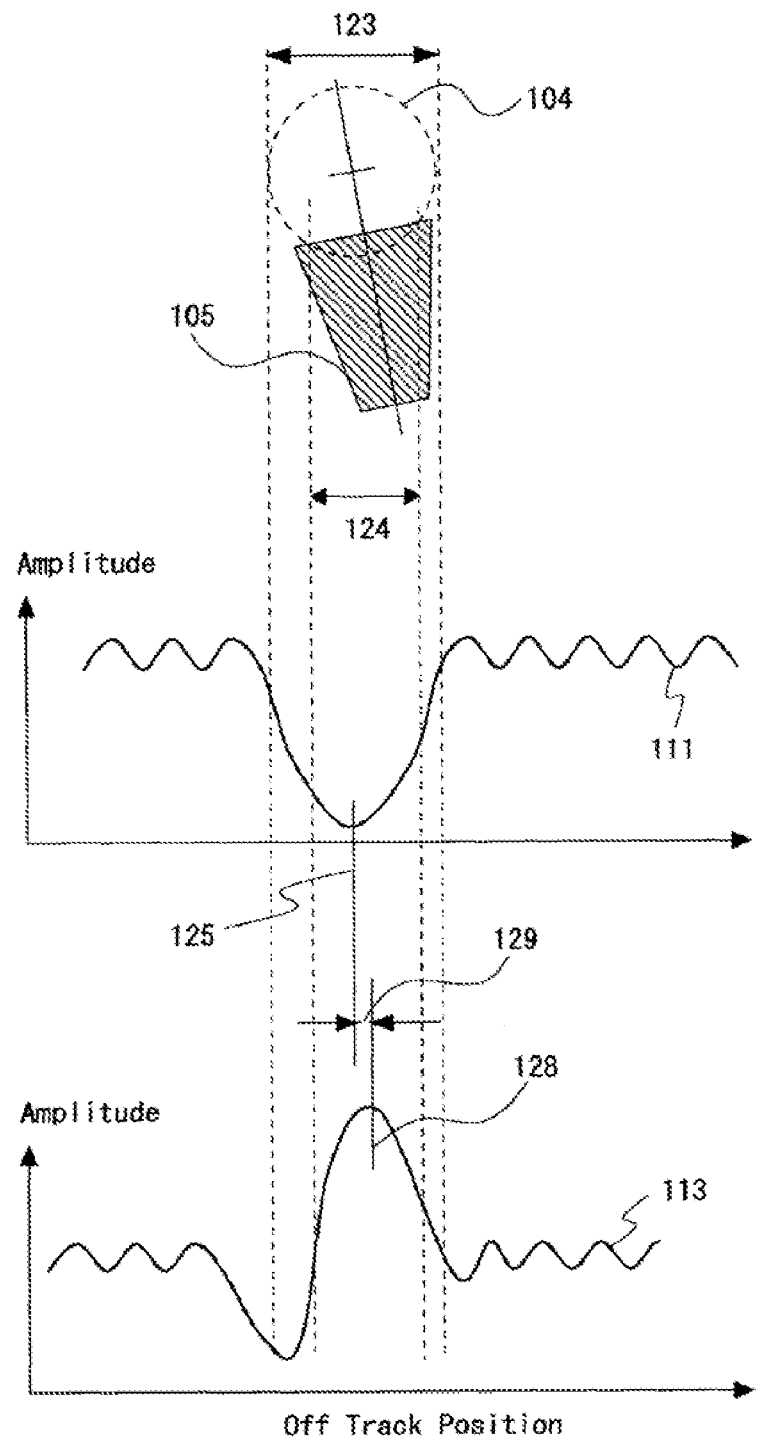
FIG. 2C is an exemplary drawing illustrating a method of measuring a heat spot diameter in the heat spot scheme, according to one embodiment.

Next, as shown in FIG. 2C, at a specific radial position, it sets a power for the heat assistance element so that the heat assistance element has a specific heat spot diameter 123. It creates an off-track profile 111 of demagnetization by the heat spot 104 and locates the center position 125 of the heat spot 104. Further, at the same disk radial position, it sets a power and a recording current for the heat assistance element so that the heat assistance element will have a specific heat spot diameter 123 and recording magnetic field width 124, and performs recording. It reads the recorded area with a reproducing element while changing its radial position in little increments, creating an off-track profile 113 of the recording.

The peak position 128 of the signal in the off-track profile 113 of recording is the same as the center position of the recording magnetic field. The gap 129 between the center position 128 of the profile 113 and the center position 125 of the profile 111 indicates the positional difference amount between the heat spot and the recording magnetic field at the disk radial position. Thus, the positional difference amount in the radial direction may be detected at each radial position.

The method performs the measurement at a plurality of different radial positions. From the relationship between the positional difference amount of the heat spot from the recording magnetic field and the radial position and the relationship between the heat spot diameter and the power obtained through the method, the power of the heat assistance element may be determined so as to obtain the optimum heat spot diameter at each radial position. The HDD controls the heat assistance element at this power. In this way, in the HAMR according to the heat spot scheme, through measurement of the heat spot diameter and the positional difference amount between the heat spot diameter and the recording magnetic field, the optimum power of the heat assistance element may be determined.

Next, referring to FIGS. 3A-3C, in an HDD according to the magnetic field scheme described with reference to FIG. 11A, a method for measuring the relationship between a heat spot diameter and a recording magnetic field will be described. In the magnetic field scheme, if a specific track width has been set, a heat spot may be controlled so as to cover an area having a width larger than the track width, according to one embodiment. To reduce power consumption, the heat spot diameter may preferably be as small as possible.

Figure 3A:
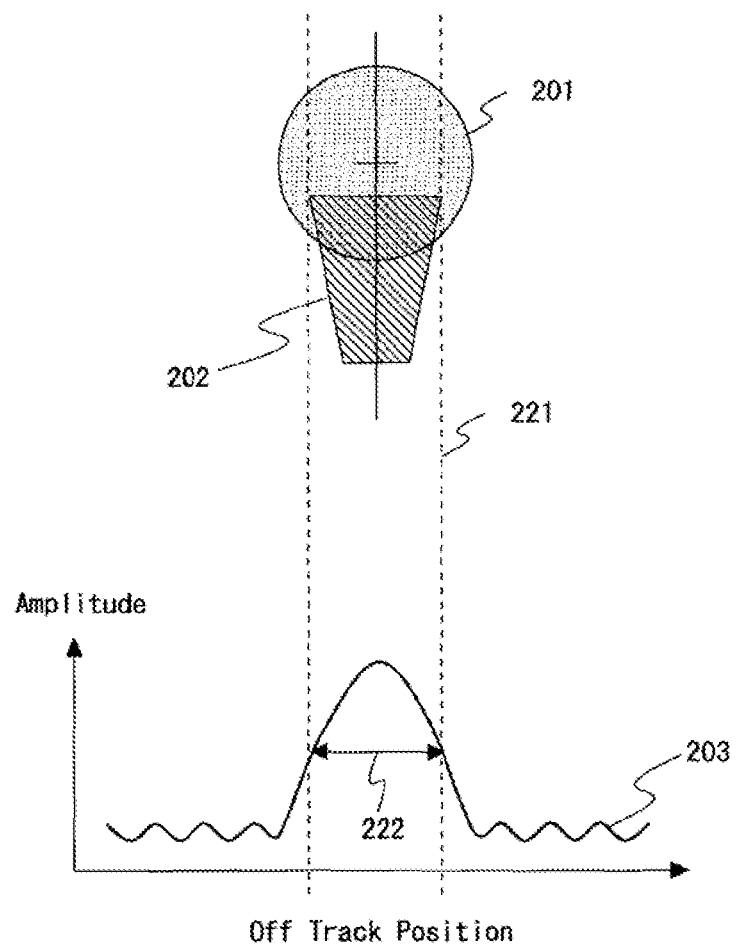
FIG. 3A is an exemplary drawing illustrating a method of measuring a heat spot diameter in the magnetic field scheme, according to one embodiment.

First, as shown in FIG. 3A, the method controls power for the heat assistance element so as to form a heat spot 201 having a sufficiently large diameter. The heat spot with a sufficient diameter covers the whole area of a recording magnetic field where Hw>Hc. Accordingly, the recording width 221 is equal to the width of the recording magnetic field (the width of the trailing edge of the recording element 202 in the drawing). The track width 222 in the off-track profile 203 thereof is denoted by Tw0.

Figure 3B:
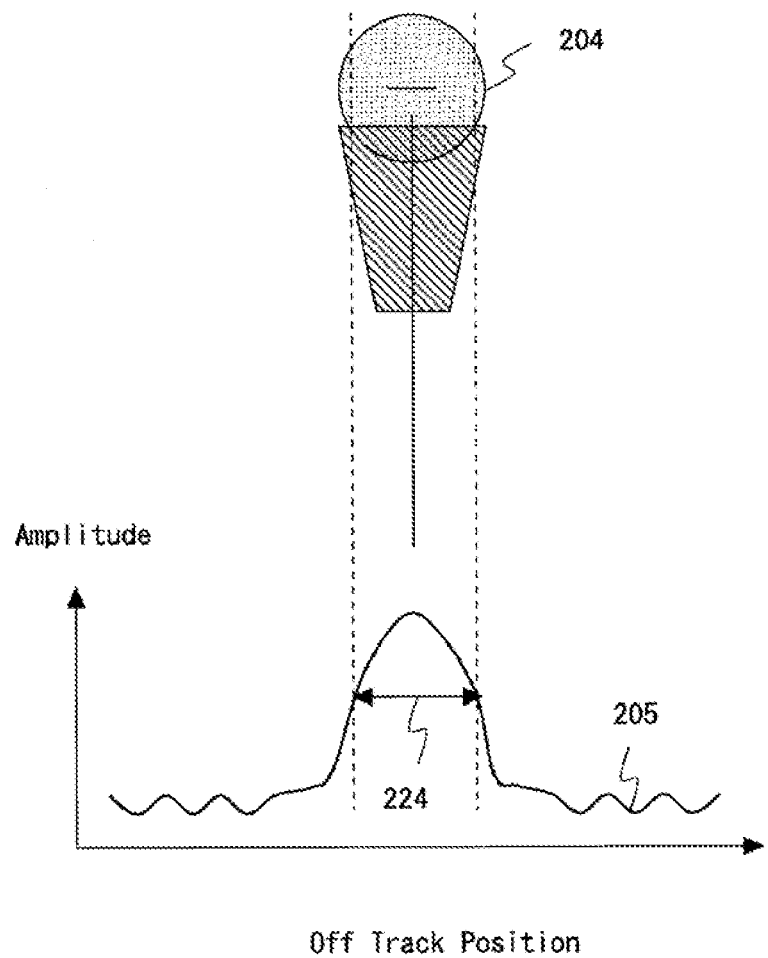
FIG. 3B is an exemplary drawing illustrating a method of measuring a heat spa diameter in the magnetic field scheme, according to one embodiment.
Figure 3C:
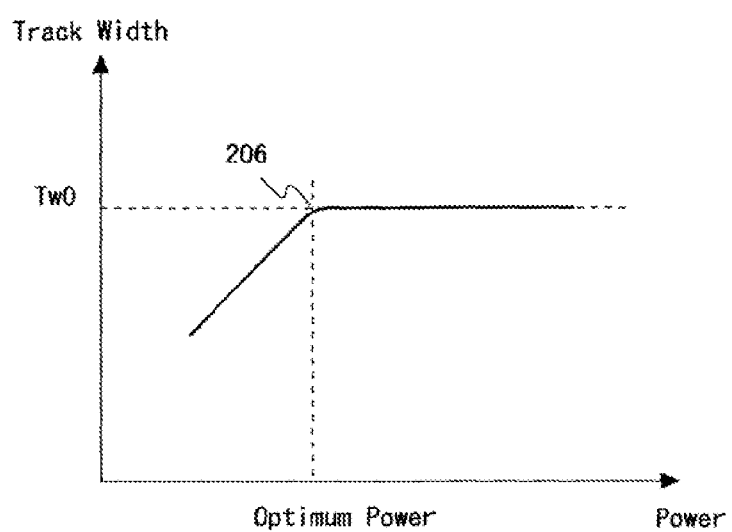
FIG. 3C is an exemplary drawing illustrating a method of measuring a heat spot diameter in the magnetic field scheme, according to one embodiment.

Next, as shown in FIG. 3B, the recording width is measured while controlling the power of the heat source so as to reduce the heat spot diameter. The off-track profile 205 by the heat spot 204 having the diameter to provide a recording width narrower than Tw0 has a track width 224. FIG. 3C illustrates the relationship between the track width and the power of the heat source. At the point 206 where the track width begins to decrease, the heat spot (diameter) overlaps the edges of the recording magnetic field. This state is the optimum heat spot diameter at the present head position (radial position).

The HDD controls, on each track (at each radial position), the heat spot (the power output of the heat assistance element) so that the heat spot diameter covers the edges of the recording magnetic field obtained through the above-described method, according to some approaches. In this way, in the HAMR according to the magnetic field scheme, an appropriate power of the heat assistance element for the radial position may be determined through the above-described measurement.

Hereinafter, recording operations of HDDs according to some approaches are described. Preferred recording operations for the three respective HAMR schemes are also explained. First, referring to FIG. 4, a preferred recording operation in an HDD which employs an HAMR according to the hybrid scheme is described, according to one embodiment.

In the HAMR according to the hybrid scheme, magnetization of the recording layer is demagnetized by both of a heat spot and a recording magnetic field. In the configuration in FIG. 4, a heat assistance element is disposed on the back side (trailing side) in the circumferential direction (flying direction) relative to the magnetic recording element. In the HAMR according to the hybrid scheme, the positional relationship between a heat spot and a recording element (recording magnetic field) affects the size in the area demagnetized by the heat spot and the recording magnetic field.

Figure 4:
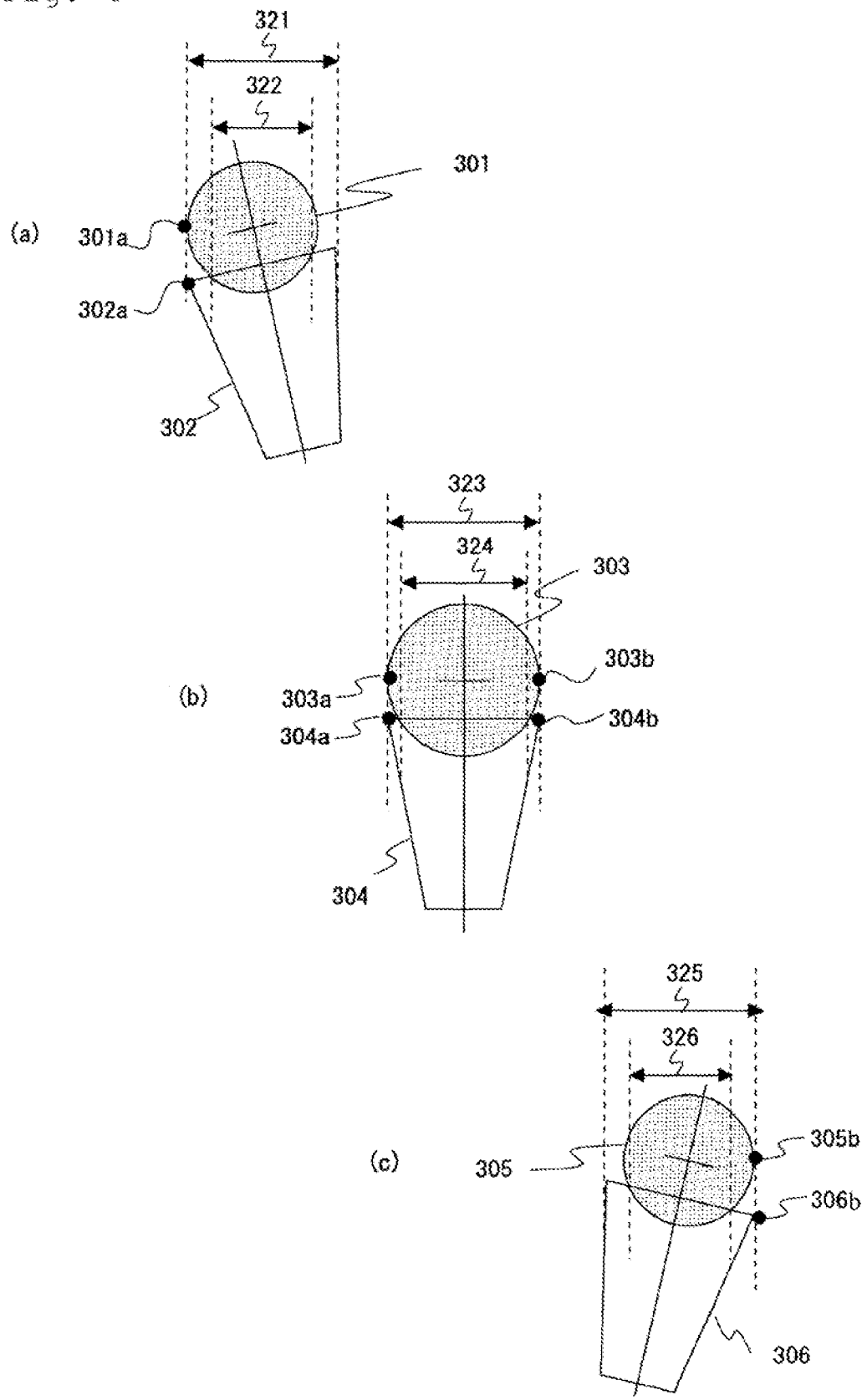
FIG. 4 includes exemplary drawings illustrating the optimum heat spot diameter in the hybrid scheme, according to one embodiment.

FIG. 4(a) illustrates a preferred relationship between a heat spot (position) 301, a magnetic recording element (position) 302, and a recording width 322 in recording a data track in the inner diameter area of a magnetic, recording medium, according to one approach. A data track consists of a recording area in the middle where data are recorded and demagnetized areas on the both sides of the recording area. The width of the recording area is the recording width 322. The width of the data track 321 is the sum of the recording width 322 and the widths of the demagnetized areas. In the hybrid scheme, edges of a data track are defined by the most distant edge pair among the edges of the heat spot and the edges of the recording magnetic field. In FIG. 4, the track widths 321, 323 and 325 are the same as the width of the recording magnetic field (122 in FIG. 1C).

The head slider moves (flies) in the direction from the top of the drawing toward the bottom. The data recording area 322 is formed where the heat spot position simultaneously overlaps with the recording magnetic field. In FIG. 4, the position where the trailing edge of the recording element overlaps the heat spot defines the conclusive recording width. In the present drawings, it is assumed that the recording element position 302 is the same as the recording magnetic field position. This assumption is applicable to the following descriptions of the other drawings.

In an inner diameter area shown in FIG. 4(a), the center of the heat spot position 301 (heat assistance element) is located inner than the center of the recording width 321 (recording element position 302) because of the effect of the skew angle. Preferably, the HDD controls the diameter of the heat spot so that the inner edge 301a of the heat spot position 301 will be located outer than the inner edge 302a of the recording magnetic field (recording element position 302). At this time, the outer edge of the heat spot position 301 is located inside of the outer edge of the recording magnetic field.

In other words, both of the inner edge and the outer edge of the heat spot position 301 are located within the recording magnetic field in the radial direction, which prevents the effect of the heat spot on the inner adjacent data track. Moreover, preferably, the HDD controls the heat spot diameter so that the inner edge 301a of the heat spot position 301 will align with the inner edge 302a of the recording magnetic field, which may suppress the proportion of the demagnetization widths in the recording width.

The skew angle is the angle between the longitudinal direction of the head slider and the tangential direction to the circumference (tangential direction to a track) of the magnetic recording medium at the position of the recording element 105. The directional difference between the longitudinal direction of the head slider and the tangential direction to the circumference differs in between the inner diameter area and the outer diameter area. In some approaches, however, the directional difference in between the inner diameter area and the outer diameter area does not matter but the measure of the angle does. Accordingly, it is sufficient to consider the skew angle in absolute values, so the skew angle is indicated in zero or positive values.

Next, FIG. 4(b) illustrates the relationship between a preferred heat spot position 303, a magnetic recording element position 304, and a recording width 324 in recording on a data track at the middle diameter position of a disk, according to some approaches. At the middle diameter position, the center of the heat spot position 303 (heat assistance element) is substantially aligned with the center of the recording width 323 (recording element position 304). In this case, the HDD controls the diameter of the heat spot so that both of the edges 303a and 303b of the heat spot will be located between the both edges 304a and 304b of the recording magnetic field (recording element position 304), which may prevent the effect of the heat spot to the both adjacent data tracks. In particular, when the both edges 303a and 303b of the heat spot are aligned with the both edges 304a and 304b of the recording magnetic field, respectively, the proportion of the demagnetization widths to the recording width may be suppressed.

Finally, the relationship between a heat spot position 305, a magnetic recording element position 306, and a recording width 326 in recording a track in the outer diameter area of a magnetic recording medium is illustrated in FIG. 4(c). In the outer diameter area, the center of the heat spot position 305 (heat assistance element) is located outside of the center of the recording width 326 (recording element position 306) because of the effect of the skew angle. Then, the HDD controls the diameter of the heat spot so that the outer edge 305b of the heat spot is located inside of the outer edge 306b of the recording magnetic field.

At this time, the inner edge of the heat spot position 301 is located outside of the inner edge of the recording magnetic field. Namely, both of the inner and outer edges of the heat spot position 301 are located within the recording magnetic field in the radial direction, which prevents the heat spot from affecting the outer adjacent data track. More preferably, the HDD controls the spot diameter so that the outer edge 305b of the heat spot aligns with the outer edge 325b of the recording magnetic field. Thereby, the proportion of the demagnetization widths to the recording width may be suppressed.

As specifically explained with reference to FIG. 4, the HDD controls the heat spot diameter on the basis of the edges of the recording magnetic field induced by the recording element in some embodiments, assuring the desired track width and reducing the effect of the heat spot to adjacent data tracks. Specifically, the HDD reduces the heat spot diameter with an increase in skew angle. For example, in some approaches, the HDD may have a function or a table for defining the heat spot diameter (the power (output) of the heat assistance element) depending on the radial position (track); the HDD controls the heat spot diameter according to those. The heat spot diameter may be specified for every track or for every group of consecutive tracks.

The present magnetic recording control, particularly the heat spot control thereof, may accomplish a proper track pitch setting at every radial position or a proper heat spot diameter for the set track pitch in the HAMR according to the hybrid scheme, in some preferred embodiments.

In addition to the above-described control method, if the demagnetization areas induced by a recording magnetic field have been figured out on both of the inner diameter side and outer diameter side, the HDD may control the heat spot diameter with reference to the edges of the data areas of the adjacent data tracks, in some approaches. For example, if the demagnetization area induced by a recording magnetic field has been figured out on the inner diameter side, the HDD may control the heat spot diameter with reference to the inner edge of the heat spot and the outer edge of the data area of the inner adjacent track. Specifically, it may exercise the control so that the inner edge of the heat spot will be located outer than the outer edge of the data area of the inner adjacent track, or be aligned with it.

If the demagnetization area induced by a magnetic field on the outer diameter side has been figured out, the HDD may control the heat spot diameter with reference to the outer edge of the heat spot and the inner edge of the data area of the outer adjacent track. Specifically, it may exercise the control so that the outer edge of the heat spot will be located inner than the inner edge of the data area of the outer adjacent track, or be aligned with it. In this way, it is sufficient if the HDD is capable of control the heat spot diameter so as not to demagnetize the data on the adjacent track.

Figure 5:
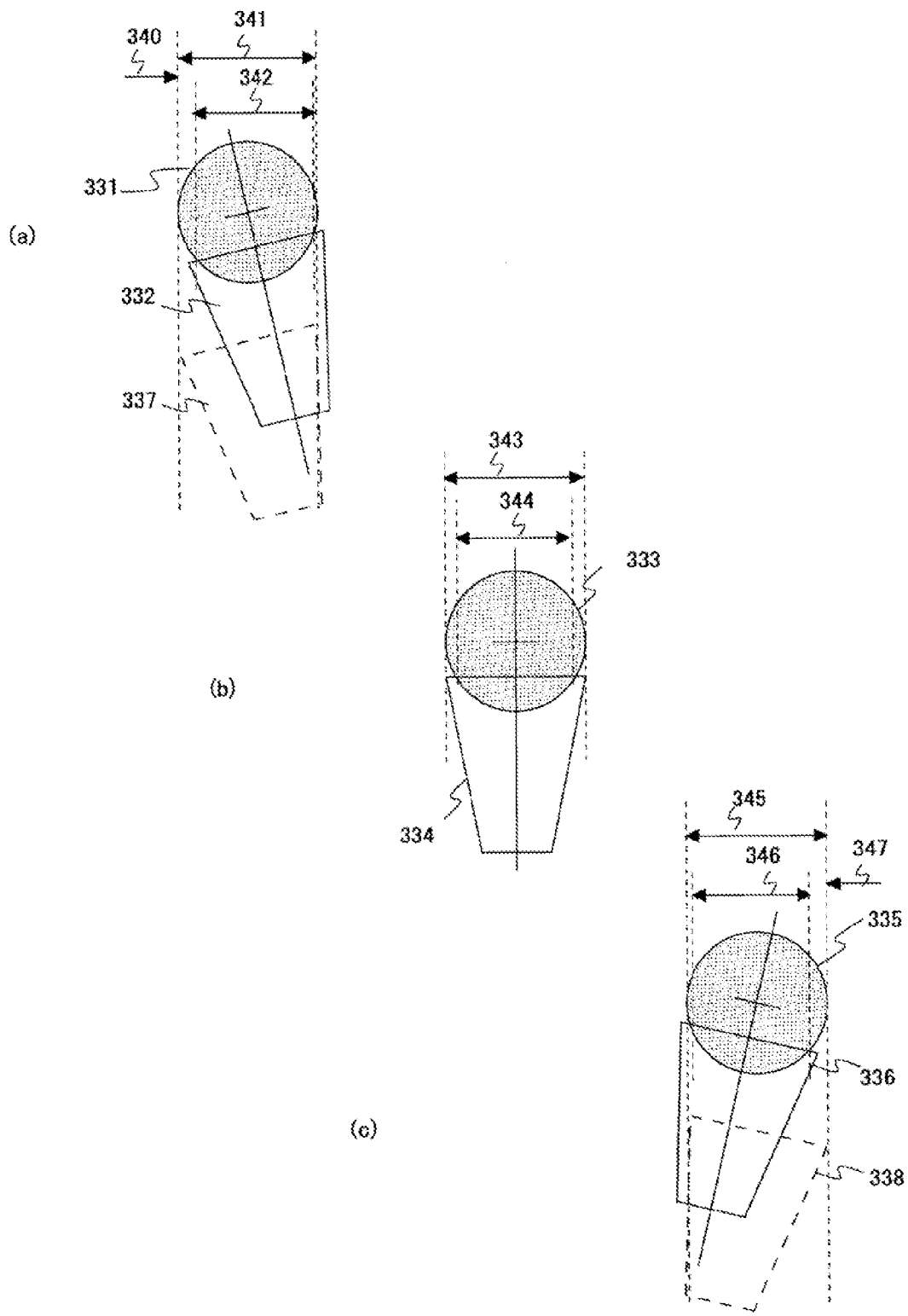
FIG. 5 includes exemplary drawings illustrating the optimum heat spot diameter in the heat spot scheme, according to one embodiment.

Next, with reference to FIG. 5, a preferred recording operation in an HDD which employs an HAMR according to the heat spot scheme is described according to one embodiment. In the HAMR according to the heat spot scheme, the magnetization of a recording layer is demagnetized by a heat spot, but the effect of the demagnetization by a recording magnetic field is small or ignorable. The positional relationship on a slider between a heat assistance element and a magnetic recording element, and the moving direction (flying direction) of a head slider are the same as those in the configuration of FIG. 4.

FIG. 5(b) illustrates the relationship between a preferred heat spot position 333, a magnetic recording element position (recording magnetic field formation position) 343, and a recording width 344 in recording on a data track at the middle diameter position. FIG. 5(b) particularly exemplifies the relationship at the zero skew. At the middle diameter position, the center of the heat spot position 333 (heat assistance element)

is substantially aligned with the center of the recording width 344 (recording element position 334).

The track width 343 is the same as the heat spot diameter in size. To avoid effecting the adjacent data tracks, the heat spot diameter is necessarily smaller than the width of the recording magnetic field. To reduce the proportion of the demagnetization area to the recording area, it is preferable that the heat spot diameter and the width of the recording magnetic field be the same in size as exemplified in FIG. 5(b), according to some approaches.

FIG. 5(a) illustrates the relationship between a preferred heat spot position 331, a magnetic recording element position (recording magnetic field formation position) 332, and a recording width 342 in recording on a data track in the inner diameter area, in some approaches. The width 341 of a data track made of a recording area and demagnetization areas is the same as the heat spot diameter in size. In the inner diameter area, the center of the heat spot position 331 is located inside of the center of the recording width 342 (recording element position 332) because of the effect of the skew angle.

Hence, with the same heat spot diameter as the one at the skew angle of 0° at the middle diameter position (refer to FIG. 5(b)), a part of the heat spot may overlap the inner adjacent track 340 so that the data on the adjacent track 340 may likely be affected by thermal demagnetization. In recording a data track in the inner diameter area, the HDD controls the heat spot to be small so that a signal recorded on the inner adjacent track 340 will not be affected, according to some approaches.

In addition, in the inner diameter area, the center of the heat spot diameter 341 is located inside of the center of the recording width 342. Namely, the inner demagnetization area of the data track has a width larger than the outer demagnetization area. Then, a preferred method positions a recording element at a position 332 which is minutely shifted outward from the original recording element position 337 as a target to increase the heat spot diameter, achieving a sufficient recording width, according to some approaches. On this occasion, as described above, the HDD controls the heat spot diameter so that the heat spot will not overlap the adjacent tracks.

FIG. 5(c) illustrates the relationship between a preferred heat spot position 335, a magnetic recording element position (recording magnetic field formation position) 336, and a recording width 346 in recording on a data track in the outer diameter area, according to some approaches. The width 345 of the data track made of a recording area and demagnetization areas is the same as the heat spot diameter in size. In the outer diameter area, the center of the heat spot position 335 is located outside of the center of the recording width 346 (recording element position 336) because of the effect of the skew angle.

Hence, with the same heat spot diameter as the one at the skew angle of 0° at the middle diameter position (refer to FIG. 5(b)), a part of the heat spot may overlap the outer adjacent track 347 so that the data on the adjacent track 347 may likely be affected by thermal demagnetization, according to some approaches. In recording a data track in the outer diameter area, the HDD controls the heat spot to be small so that a signal recorded on the outer adjacent track 347 will not receive the effect.

In addition, in the outer diameter area, the center of the track width 345 is located outside of the center of the recording width 346. Namely, the outer demagnetization area of the data track has a larger width than the inner demagnetization area. Then, a preferred method positions a recording element at a position 336 which is minutely shifted inward from the original recording element position 338 to increase the heat spot diameter, achieving a sufficient recording width, according to some approaches. On this occasion, as described above, the HDD controls the heat spot diameter so that the heat spot will not overlap the adjacent tracks.

As set forth above, the HDD reduces the heat spot diameter with an increase in skew angle to attain a proper track pitch setting or a proper heat spot diameter for the set track pitch at every radial position. Thereby, the effects to the adjacent tracks may be suppressed as much as possible and the reliability in data on the adjacent tracks is sufficiently attained. Moreover, adjustment of the recording element position depending on the radial position accomplishes a wider recording width.

In a specific operation, the HDD has a function or a table for defining the heat spot diameter (the power (output) of the heat assistance element) depending on the radial position (track); the HDD controls the heat spot diameter according to those, according to some approaches. The heat spot diameter may be defined for every track or for every group of consecutive tracks.

Figure 6:
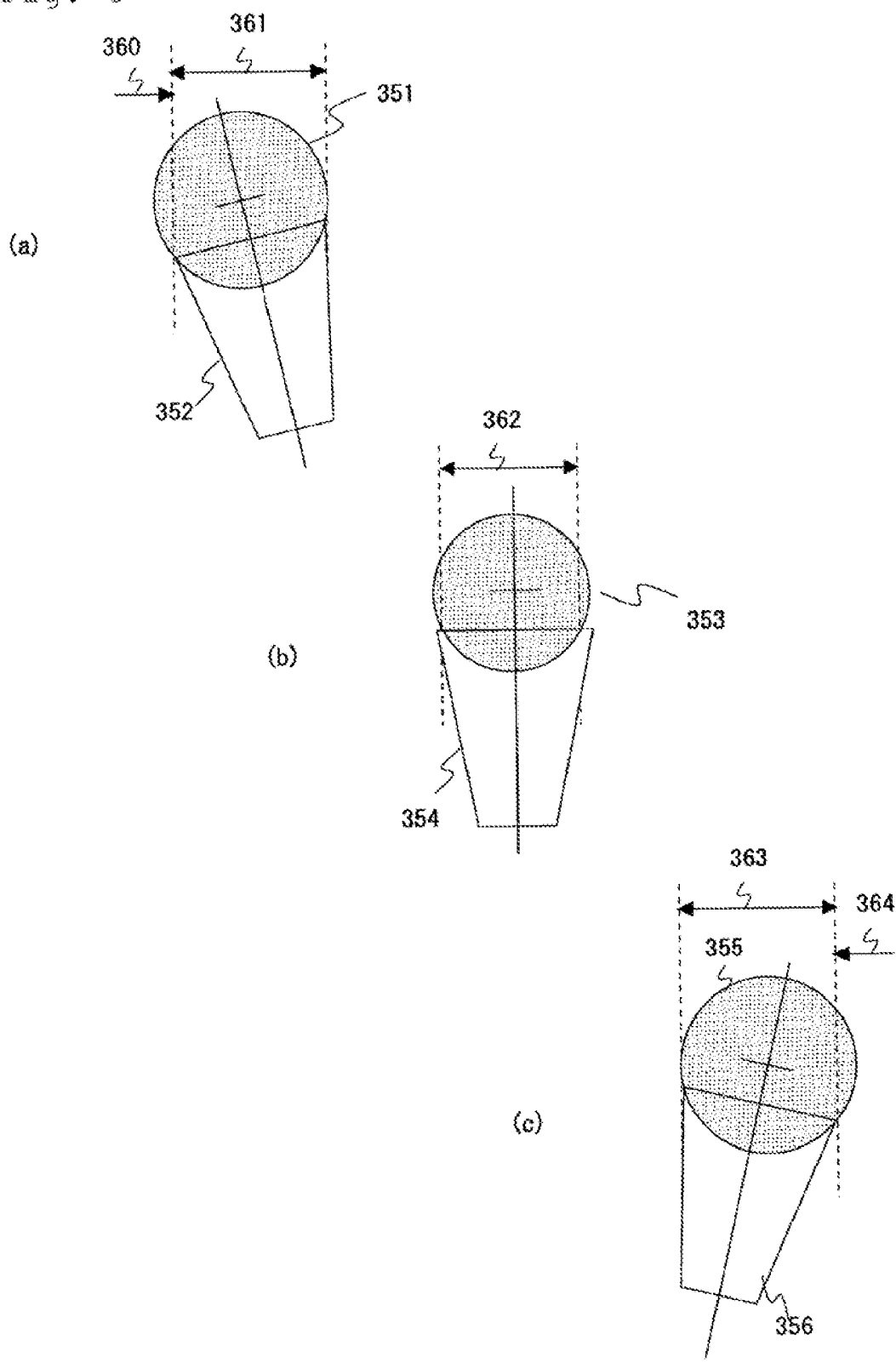
FIG. 6 includes exemplary drawings illustrating the optimum heat spot diameter in the magnetic field scheme, according to one embodiment.

Next, with reference to FIG. 6, a preferred recording operation in an HDD which employs an HAMR according to the magnetic field scheme is described, according to some approaches. The positional relationship on a slider between a heat assistance element and a magnetic recording element, and the moving direction (flying direction) of a head slider are the same as those in the configuration of FIG. 4. In the HAMR according to the magnetic field scheme, the magnetization of a recording layer is demagnetized by the recording magnetic field from the recording element, but the effect of the demagnetization by the heat spot is small or substantially does not exist.

In the present configuration, the HDD controls the heat spot diameter so as to suppress the variations in recording width depending on the radial position and to save electric power consumption, according to some approaches. FIG. 6(a) illustrates the relationship between a preferred heat spot position 351, a recording element position (recording magnetic field position) 352, and a recording width 361 in the inner diameter area, according to some approaches. The recording area is determined by the magnetic recording element position 352. The width of the recording magnetic field (the size in the radial direction) decreases as the skew angle increases. Accordingly, the HDD increases the heat spot diameter in the inner diameter area to compensate for a part or all of the reduction in recording width caused by the skew.

FIG. 6(b) illustrates the relationship between a heat spot position 353, a recording element position (recording magnetic field position) 354, and a recording width 362 at the middle diameter position, according to some approaches. The skew angle is zero. The recording area is determined by the magnetic recording element position 354.

FIG. 6(c) illustrates the relationship between a heat spot position 355, a recording element position (recording magnetic field position) 356, and a recording width 363 in the outer diameter area, according to some approaches. The recording area is determined by the magnetic recording element position 356. The width of the recording magnetic field (the size in the radial direction) decreases as the skew angle increases. Accordingly, the HDD increases the heat spot diameter in the outer diameter area to compensate for a part or all of the decrease in recording width caused by the skew.

As set forth above, the HDD increases the heat spot diameter with increase in skew angle to suppress variations in the width of the recorded signal depending on the radial position or to keep the width of the recorded signal constant in the system where the recording magnetic field determines the recording position, which may increase the signal to noise ratio, according to some embodiments. Besides, it reduces the heat spot diameter so that the heat spot diameter will not include a large unnecessary range, which accomplishes reduction in power consumption. For example, according to some approaches, the HDD may have a function or a table for defining the heat spot diameter (power) depending on the radial position (track); then it controls the heat spot diameter according to those. The heat spot diameter may be defined for every track or for every group of consecutive tracks.

Hereinafter, with reference to FIGS. 7A-7C, control methods of a heat spot diameter when writing a positioning signal (servo data) (servo write) are described, according to some approaches. In general, two methods have been known as techniques of servo writing to a magnetic recording medium mounted on an HDD housing. One of the methods mechanically controls an actuator mounted on the HDD using an external mechanism to write servo data to a magnetic recording medium with a head slider mounted on the HDD. The other method controls a voice coil motor of an actuator by a control circuit implemented in the HDD or an external computer to write servo data to a magnetic recording medium with a head slider mounted on the HDD. Embodiments are applicable to both methods of servo writing.

Hereinafter, an example of servo write using the HAMR according to the hybrid scheme is described, according to some approaches. Servo data are recorded in a width (servo track width) equal to or narrower than the data track width. Typically, the data track width is defined by the recording element width (or the data track width is formed so as to conform to a data track width). Hence, the servo write successively writes servo data having a narrower width while overwriting a part of the servo data. Hereinbelow, the servo data written in a single rotation of a disk are referred to as a servo write track.

Typically, servo data are written in one direction, from the innermost diameter to the outermost diameter or from the outermost diameter to the innermost diameter, all over the tracks. In FIGS. 7A-7C, an example will be described in which the servo data are sequentially written from the innermost diameter to the outermost diameter. When the servo writes a servo write track No. n+1 after having written a servo write track No. n, an outer part of the servo write track No. n is overwritten by the servo write track No. n+1.

Accordingly, when the servo write track No. n+1 has been written, the servo write track No. n remains only as the inner part thereof. Hence, the HDD controls the heat spot diameter so that the inner edge of the heat spot is located outside of the inner edge of the recording magnetic field, according to some approaches. This prevents effects of demagnetization by the heat spot to the previously written inner servo write track. Preferably, as exemplified in FIGS. 7A-7C, the HDD controls the heat spot diameter so that the inner edge of the heat spot is aligned with the inner edge of the recording magnetic field, which accomplishes a wider recording width.

Figure 7A:
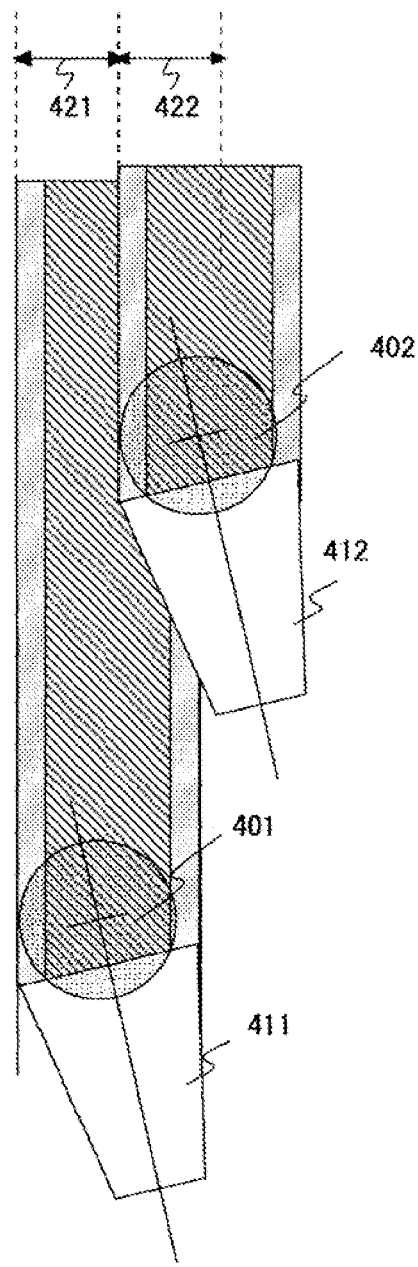
FIG. 7A is an exemplary drawing illustrating the optimum heat spot diameter in recording a positioning signal, according to one embodiment.

In the inner diameter area, as illustrated in FIG. 7A, when writing a servo write track, the center of a heat spot 401 is located inside of the center of a servo write track 421 (the last recorded track) because of the effect of the skew angle, according to some approaches. Accordingly, the method reduces the heat spot diameter so that the inner edge of a heat spot 402 is aligned with the inner edge of a recording magnetic field (recording element 412). Such control accomplishes a servo write track No. ni (421) without deterioration caused by the heat spot 402 in writing a servo write track No. ni+1 (422), even after the servo write track No. ni+1 (422) has been written.

Figure 7B:
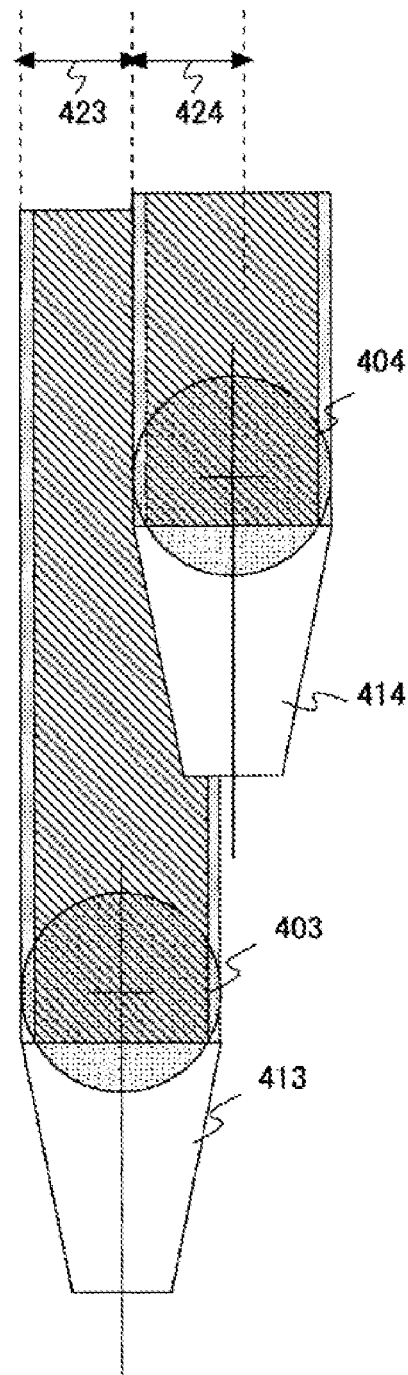
FIG. 7B is an exemplary drawing illustrating the optimum heat spot diameter in recording a positioning signal, according to one embodiment.
Figure 7C:
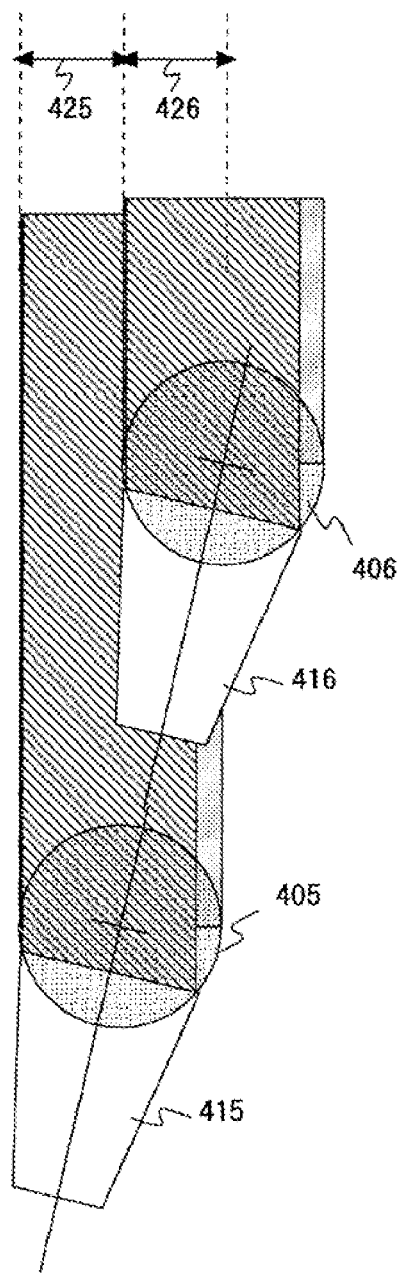
FIG. 7C is an exemplary drawing illustrating the optimum heat spot diameter in recording a positioning signal, according to one embodiment.

At the middle diameter position, as illustrated in FIG. 7B, in writing a servo write track, the centers of heat spots 403 and 404 are aligned with the centers of recording elements 413 and 414, respectively, according to some approaches. The HDD controls the heat spot diameter so as to align the inner edges of the heat spots 403 and 404 with the inner edges of recording magnetic fields (recording elements 413 and 414). Such control accomplishes a servo write track No. nm (423) without deterioration caused by the heat spot 404 in writing a servo write track No. nm+1 (424), even after the servo write track No. nm+1 (424) has been written. Similarly, in the outer diameter area, as illustrated in FIG. 7C, the centers of heat spots 405 and 406 are located outer than the centers of servo write tracks at the time of writing, according to some approaches. Accordingly, the HDD increases the heat spot diameter to align the heat spots 405 and 406 with the inner edges of recording magnetic fields (recording elements 415 and 416). Such control accomplishes a servo write track No. no (425) without deterioration caused by the heat spot 406 in writing a servo write track No. no+1 (426), even after the servo write track No. no+1 (426) has been written.

If the direction of sequential writing proceeds from the outer diameter side toward the inner diameter side, servo data may be sequentially written in the same manner as in the above description, while controlling the outer edge of a heat spot to align with the outer edge of a recording magnetic field. Controlling the heat spot diameter to conform to a head position as in the above description may prevent demagnetization in the adjacent servo data by the heat spot and accomplish writing of high quality servo data.

Hereinafter, with reference to FIGS. 8A-8D, control methods of a heat spot diameter in the shingled write recording scheme are explained, according to some embodiments. Specific descriptions are given to an example in the HAMR according to the hybrid scheme. The shingled write recording scheme is a recording scheme that records a plurality of consecutive data tracks consecutively, while overwriting a part of each data track to achieve narrower data tracks. Typically, it gathers several to dozens of tracks into a group and performs recording in units of the group. The shingled write recording scheme provides two types of techniques: one of them keeps the direction of sequential writing unchanged regardless of the radial position, and the other changes the direction of sequential writing depending on the radial position.

Figure 8A:
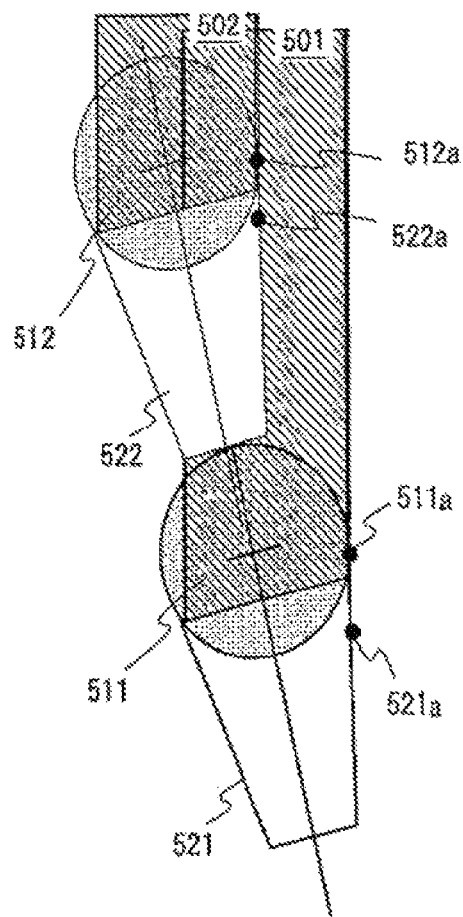
FIG. 8A is an exemplary drawing illustrating the optimum heat spot diameter in the shingled write recording scheme, according to one embodiment.
Figure 8B:
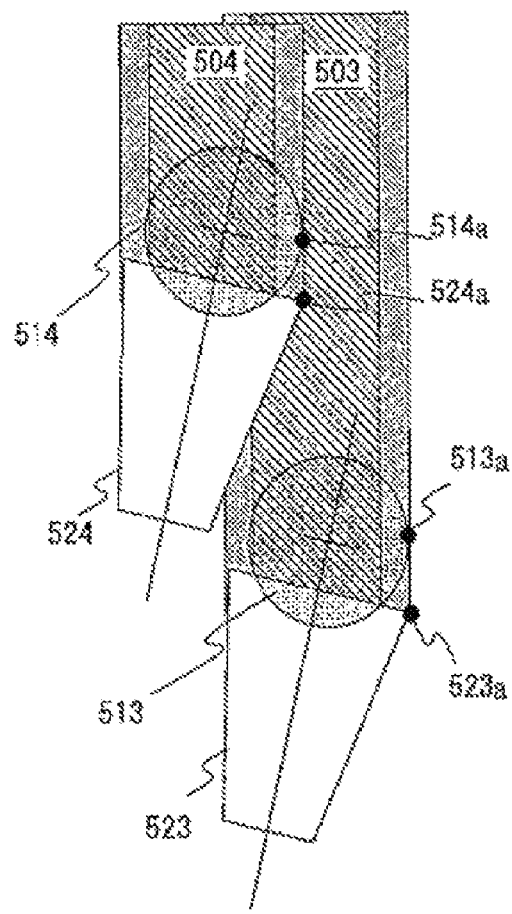
FIG. 8B is an exemplary drawing illustrating the optimum heat spot diameter in the shingled write recording scheme, according to one embodiment.
Figure 8C:
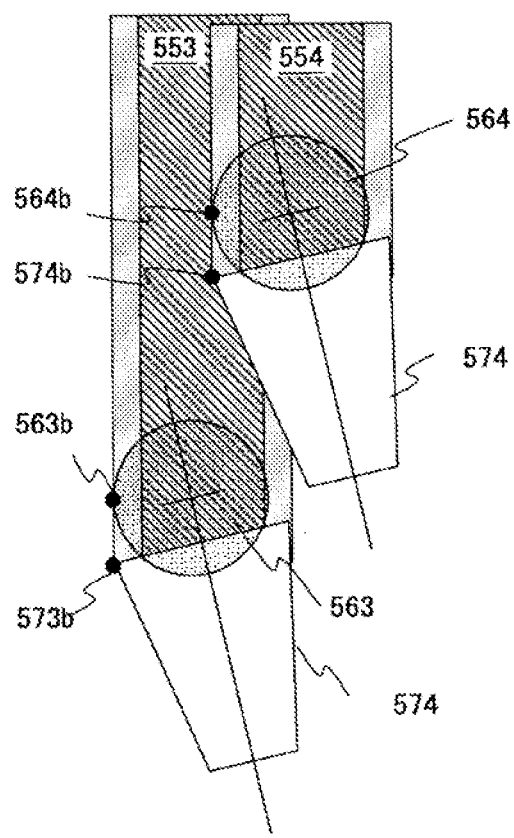
FIG. 8C is an exemplary drawing illustrating the optimum heat spot diameter in the shingled write recording scheme, according to one embodiment.
Figure 8D:
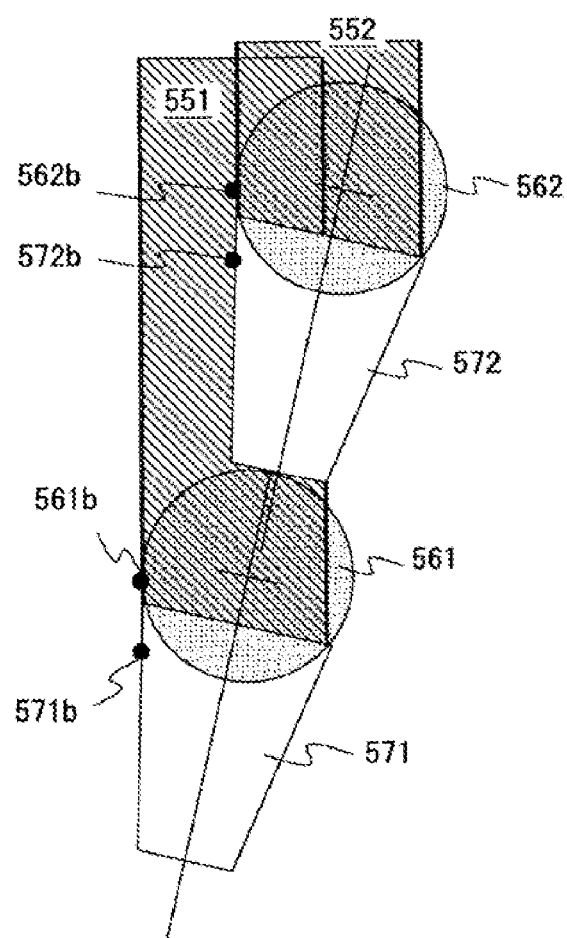
FIG. 8D is an exemplary drawing illustrating the optimum heat spot diameter in the shingled write recording scheme, according to one embodiment.

FIGS. 8A-8B illustrate examples in which grouped tracks are written sequentially from the outer diameter area toward the inner diameter area. FIGS. 8C-8D illustrate examples in which grouped tracks are written sequentially from the inner diameter area toward the outer diameter area. FIGS. 8A and 8C show examples in which the tracks to be recorded are in the inner diameter area of the whole recording surface. FIGS. 8B and 8D show examples in which the tracks to be recorded are in the outer diameter area of the whole recording surface. In all of the drawings, X number of tracks constitute one group to be consecutively recorded and reproduced.

First, examples in which the sequential writing proceeds from the outer diameter area toward the inner diameter area are described, where the HDD controls a heat spot diameter so that the outer edge of the heat spot diameter is located inside of the outer edge of the recording magnetic field, according to some approaches. The outer diameter area exhibits an arrangement shown in FIG. 8B, where heat spot positions 513 and 514, recording element positions 523 and 524, and track positions 503 and 504 are exemplified. in this case, the heat spot position No. n (513) is located outside of the recording element position 523.

The HDD reduces the heat spot diameter so that the outer edge 513a of the heat spot will be located inside of the outer edge 523a of the recording magnetic field. Preferably, it controls the output of the heat assistance element to align the outer edge 513a of the heat spot with the outer edge 523a of the recording magnetic field. Thereby, the inner edge of the heat spot is located outside of the inner edge of the recording magnetic field and the heat spot width is located within the recording magnetic field width.

In recording the track No. n+1 (504) next to the recording of the track No. n (503), the HDD records it while overlapping the track No. n+1 (504) with a part of the track No. n (503). The heat spot control in recording the track No. n+1 (504) is the same as the one in recording the track No. n (503). In the example of FIG. 8B, the HDD performs recording while controlling the heat spot diameter so as to align the outer edge 514a of the heat spot with the outer edge 524a of the recording magnetic field. Thereby, the information recorded on the track No. n (503) is not demagnetized by the heat spot 514 but may be maintained in recording the track No. n+1 (504).

The inner diameter area exhibits an arrangement shown in FIG. 8A, where a heat spot position 511 is located inner than a recording element position 521. Like the control in the outer diameter area, the HDD increases the heat spot diameter so that the outer edge 511a of the heat spot 511 is located inside of the outer edge 521a of the recording magnetic field. Preferably, it aligns the outer edge 511a of the heat spot 511 with the outer edge 521a of the recording magnetic field. Thereby, information may be recorded up to the outer edge of the recording magnetic field on the track No. m (501).

Then, in recording the track No. m+1 (502), the HDD records it while overlapping the track No. m+1 (502) with a part of the track No. m (501). The heat spot control is the same as the one in recording the track No. m (501). Since the track No. m (501) contains information to the outer edge of the recording magnetic field, the information will not be lost after the track No. m+1 has been recorded. Besides, control in such a manner that the outer edge 512a of the heat spot 512 is located inside of the outer edge 522a of the recording magnetic field eliminates demagnetization by the heat spot 512 in recording the track No. m+1 (502).

In the inner diameter area, the inner edge of the heat spot is located inside of the inner edge of the recording magnetic field. Hence, in recording the innermost data track in a group, the inner adjacent group of data tracks may be affected by demagnetization. To cope with the demagnetization, several methods may be used. For example, space may be provided between two groups so as to reduce the effect of demagnetization by the heat spot, the heat spot diameter may be reduced in data recording on the innermost track, a sufficient recording width may be given by design even if the heat spot demagnetizes the track, etc.

Next, examples in which the sequential writing proceeds from the inner area toward the outer area (FIGS. 8C and 8D) are described, where the HDD controls a heat spot diameter so that the inner edge of the heat spot diameter will be located outside of the inner edge of a recording magnetic field, according to some approaches. The inner diameter area exhibits an arrangement shown in FIG. 8C, where a heat spot position 563 is located inside of the recording element position 573. The HDD controls the heat spot diameter (the output of the heat assistance element for defining the heat spot diameter) so that the inner edge 563b of the heat spot is outside of the inner edge 573b of the recording magnetic field. In this case, on the outer diameter side, the edge of the heat spot is located inside of the edge of the recording magnetic field. Preferably, the HDD aligns the inner edge 563b of the heat spot with the inner edge 573b of the recording magnetic field.

In recording the track No. m+X−1 (554) next to the recording of the track No. m+X (553), the HDD records it while overlapping the track No. m+X−1 (554) with a part of the track No. m+X (553). The HDD performs the recording while controlling the heat spot diameter so as to be small, whereby the information recorded on the track No. m+X (553) is not demagnetized by the heat spot 564b but may be maintained.

The outer diameter area exhibits an arrangement shown in FIG. 8D, where a heat spot position 561 is located outside of a recording element position 571. The HDD controls the heat spot diameter (the output of the heat assistance element for defining the heat spot diameter) so that the inner edge 561b of the heat spot is located outside of the inner edge 571b of the recording magnetic field, according to some approaches. Preferably, it increases the heat spot diameter so that the inner edge 561b of the heat spot is aligned with the inner edge 571b of the recording magnetic field. On the track No. n+X (551), information may be recorded up to the inner edge 71b of the recording magnetic field.

Then, in recording the track No. n+X−1 (552), the HDD records it while overlapping the track No. n+X−1 (552) with a part of the track No. n+X (551). Since the track No. n+X (551) contains information to the inner edge 571b of the recording magnetic field, the information will not be lost even if the track No. n+X−1 has been recorded. Besides, control in such a manner that the inner edge 562b of the heat spot 552 will be located outside of the inner edge 572b of the recording magnetic field, or preferably that the inner edge 562b of the heat spot 552 is aligned with the inner edge 572b eliminates demagnetization by the heat spot 562 in recording the track No. n+X−1 (552).

In the outer diameter area, the outer edge of the heat spot is located outside of the outer edge of the recording magnetic field. Hence, in recording the outermost data track in a group, the outer adjacent group of data tracks may be affected by demagnetization. The examples explained with reference to FIGS. 8A and 8B may cope with the demagnetization.

As set forth above, according to the some configurations, a magnetic recording device employing the shingled write recording scheme in the HAMR may attain the same track pitch as the one attained according to the conventional shingled write scheme, preventing data (signal) writing of low quality caused by demagnetization of data with the heat spot or difference in the heat spot position, according to some approaches.

Figure 9:
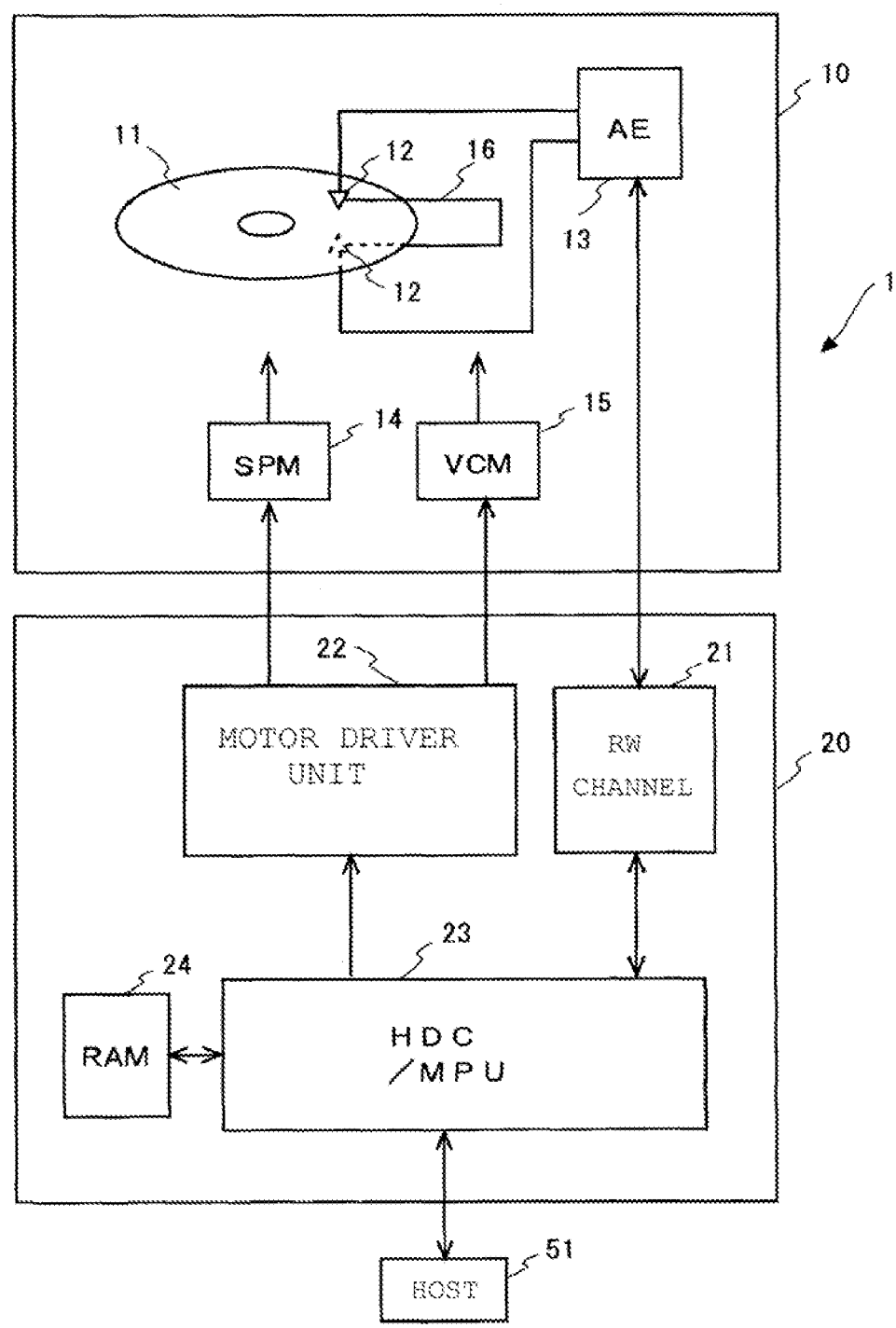
FIG. 9 is an exemplary block diagram schematically depicting an entire configuration of an HDD, according to one embodiment.
Figure 10:
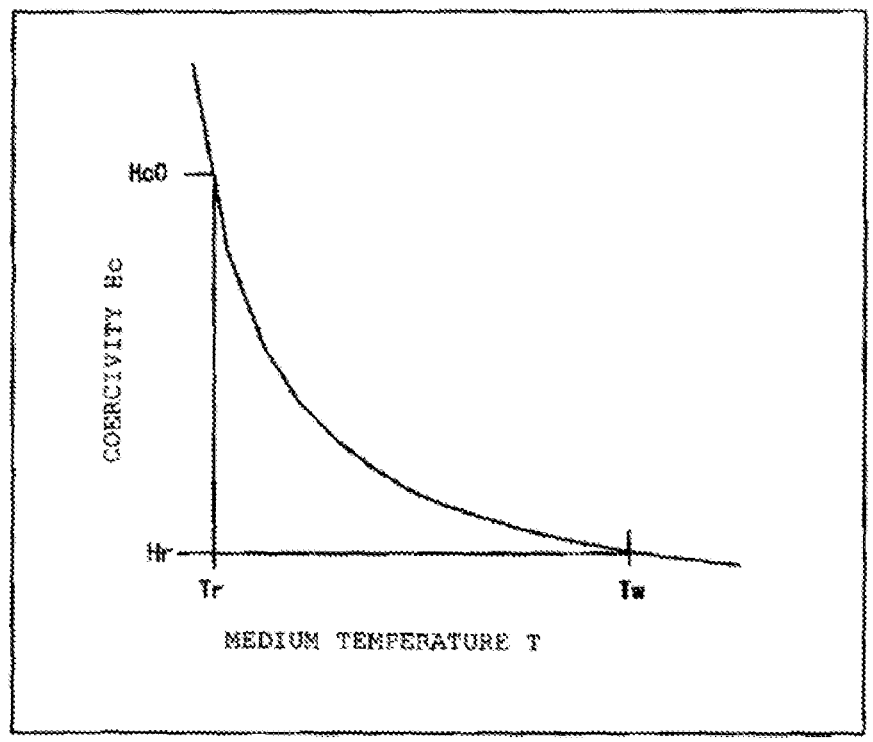
FIG. 10 is an exemplary drawing illustrating the relationship between the coercivity of a magnetic disk and the temperature in the explanation of a conventional technique.

Finally, the entire configuration of an HDD to which embodiments are applicable is described with reference to FIG. 9, which is a block diagram schematically depicting the entire configuration of an HDD, according to some approaches. The HDD 1 comprises a magnetic recording medium 11, a disk for storing data, inside an enclosure 10. A spindle motor (SPM) 14 spins the magnetic recording medium 11 at a specific angular rate. Head sliders 12 are provided to access the magnetic recording medium 11, and/or each of the magnetic recording medium 11.

Head sliders 12 are fixed to the tip of an actuator 16. The actuator 16, which is coupled to a voice coil motor (VCM) 15, pivots around a pivotal shaft to move the head sliders 12 above a spinning magnetic recording medium 11 in its radial direction. Each head slider 12 comprises a slider for flying above the magnetic recording medium and a head element portion which is bonded to the slider and converts magnetic signals to and from electric signals. The head slider 12, according to some approaches, further comprises a recording assistance element to apply energy for assisting magnetic recording by the recording magnetic field from the recording element to the magnetic recording layer.

On a circuit board 20 fixed outside the enclosure 10, circuit elements are mounted. A motor driver unit 22 drives the SPM 14 and the VCM 15 in accordance with control data from an HDC/MPU 23. A RAM 24 functions as a buffer for temporarily storing read data and write data. An arm electronics (AE) 13 inside the enclosure 10 selects a head slider 12 to access the magnetic recording medium 11 out of the multiple head sliders 12, amplifies a reproducing signal therefrom, and sends it to a read-write channel (RW channel) 21. The AE 13 further sends a recording signal and a signal (including power) for the recording assistance element from the RW channel 21 to the selected head slider 12. In this regard, embodiments may be applied to an HDD having a single head slider 12. The signal for the recording assistance element may be transmitted through another circuit instead of the AE 13.

The RW channel 21, in a read operation, amplifies a read signal supplied from the AE 13 to have predetermined amplitude, extracts data from the obtained read signal, and decodes the data. The retrieved data includes user data and servo data. The decoded read user data and servo data are supplied to the HDC/MPU 23. The RW channel 21, in a write operation, code-modulates write data supplied from the HDC/MPU 23, converts the code-modulated data into a write signal (analog signal), and then supplies it to the AE 13.

The HDC/MPU 23, a controller, performs entire control of the HDD 1 in addition to necessary processes concerning data processing such as read/write operation control, command execution order management, positioning control of the head sliders 12 using servo signals (servo control), interface control to and from a host 51, defect management, and error handling when any error occurs, according to some approaches. The HDC/MPU 23 sets control data to the AE 13 to control the assistance range formed by the recording assistance element. The control of the assistance range by the HDC/MPU 23 is exercised according to the method described previously, according to some approaches.

As set forth above, the present invention has been described by way of example of a preferred embodiment, but is not limited to the above embodiment. A person skilled in the art may easily modify, add, or convert the components in the above embodiment within the scope of the present invention. For example, an HDD has been described by way of example in the present embodiment, but the present invention is applicable to an information recording and reproducing device utilizing the HAMR, such as an MO.

Moreover, in the present embodiment, the heat assistance element is displaced backward (on the trailing side) with respect to the magnetic recording element, but the present invention is applicable to a device with the heat source disposed forward (on the leading side) with respect to the magnetic recording element under control for attaining the effects in the above-described embodiment. The present invention may be also applied to a magnetic disk drive which applies energy other than heat to the magnetic recording layer to assist magnetic recording.

It should be noted that methodology presented herein for at least some of the various embodiments may be implemented, in whole or in part, in computer hardware, software, by hand, using specialty equipment, etc., and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording device comprising:
   a magnetic recording medium having a magnetic recording layer;
   a recording element positioned on a head slider;
   an assistance element for supplying assistance energy to an area on the recording layer to which a recording magnetic field generated by the recording element is applied, the assistance element being positioned on the head slider; and
   a controller for controlling a size of an assistance area from the assistance element in accordance with a position of the head slider in a radial direction of the magnetic recording medium.

2. The magnetic recording device according to claim 1, wherein the controller reduces the assistance area in accordance with an increase in a skew angle, wherein the skew angle is the directional difference between of a longitudinal direction of the head slider and a recording track.

3. The magnetic recording device according to claim 1, wherein the controller controls the assistance element so that a width of the assistance area in the radial direction of the magnetic recording medium is located within a recording magnetic field width of the recording element.

4. The magnetic recording device according to claim 1, wherein the controller sequentially writes a plurality of consecutive recording tracks from one side in the radial direction of the magnetic recording medium so that each track overlaps a part of an adjacent recording track which has already been written, and wherein the controller controls the assistance element so that an edge of one side of the assistance area is located within the recording magnetic field of the recording element in each writing of the plurality of consecutive recording tracks.

5. The magnetic recording device according to claim 1, wherein the controller corrects a target position of the recording element in accordance with a difference caused by a skew angle between a center of the assistance area and a center of the recording magnetic field of the recording element.

6. The magnetic recording device according to claim 1, wherein the controller determines the assistance area at each radial position based at least in part on a difference measured between a center of a recording magnetic field width of the recording element and a center of the assistance area at different radial positions.

7. The magnetic recording device according to claim 6, wherein the controller measures an area demagnetized by the assistance area and an area demagnetized by the recording magnetic field at each radial position to determine the difference between a center of a recording magnetic field width of the recording element and a center of the assistance area at different radial positions.

8. The magnetic recording device according to claim 6, wherein the controller measures an area demagnetized by the assistance area and a width recorded by the assistance area and the recording magnetic field at each radial position to determine the difference between a center of a recording magnetic field width of the recording element and a center of the assistance area at different radial positions.

9. A method for recording data onto a recording layer of a magnetic recording medium, the method comprising:
   measuring a difference between a center of a recording magnetic field width of a recording element and a center of an assistance area of an assistance element at different radial positions of a magnetic recording medium;

determining a size of the assistance area appropriate for each radial position of the magnetic recording medium in accordance with the measured difference; and registering data indicating the size of the assistance area appropriate for each radial position.

10. The method according to claim 9, wherein the difference between a center of a recording magnetic field width of a magnetic recording element and a center of an assistance area of an assistance element is measured by measuring an area demagnetized by the assistance area and an area demagnetized by the recording magnetic field at each radial position of a magnetic recording medium.

11. The method according to claim 10, wherein the difference between a center of a recording magnetic field width of a magnetic recording element and a center of an assistance area of an assistance element is measured by measuring an area demagnetized by the assistance area and a width recorded by the assistance area and the recording magnetic field at each radial position of a magnetic recording medium.

12. The method according to claim 9, wherein the data indicates that the assistance area is reduced in accordance with an increase in a skew angle between the recording element and a recording track.

13. The method according to claim 9, wherein the data indicates that the assistance element is controlled such that a width of the assistance area in a radial direction of the magnetic recording medium is located within the recording magnetic field width of a magnetic recording element.

14. The method according to claim 9, wherein if a plurality of consecutive recording tracks are sequentially written with the magnetic recording element in a radial direction from one side of the magnetic recording medium such that each recording track overlaps a part of an adjacent recording track which has already been written, wherein the data indicates that the assistance element is controlled such that an edge of one side of the assistance area is located within the recording magnetic field of the recording element in each writing of the plurality of consecutive recording tracks.

\* \* \* \* \*